(12) United States Patent
Kishen et al.

(10) Patent No.: US 10,778,513 B2
(45) Date of Patent: Sep. 15, 2020

(54) DEVICE COMMUNICATION AND MANAGEMENT IN COMPUTER DATA NETWORKS

(71) Applicant: QLOUDABLE, INC., Redmond, WA (US)

(72) Inventors: Parthu Kishen, Renton, WA (US); Sellappa Gopalaswamy, Redmond, WA (US); Pradeep Rajurs, Bellevue, WA (US); Ram Thummala, Las Vegas, NV (US)

(73) Assignee: QLOUDABLE, INC., Redmond, WA (US)

( * ) Notice: Subject to any disclaimer, the term of this patent is extended or adjusted under 35 U.S.C. 154(b) by 0 days.

(21) Appl. No.: 16/802,958

(22) Filed: Feb. 27, 2020

(65) Prior Publication Data

US 2020/0195500 A1    Jun. 18, 2020

Related U.S. Application Data

(63) Continuation of application No. PCT/US2018/053167, filed on Sep. 27, 2018.
(Continued)

(51) Int. Cl.
*G06F 15/177* (2006.01)
*H04L 12/24* (2006.01)
*G06F 9/455* (2018.01)

(52) U.S. Cl.
CPC ...... *H04L 41/0806* (2013.01); *G06F 9/45558* (2013.01); *H04L 41/0843* (2013.01);
(Continued)

(58) Field of Classification Search
CPC ............ H04L 41/0806; H04L 41/0843; G06F 9/45558; G06F 2009/4557; G06F 2009/45595
(Continued)

(56) References Cited

U.S. PATENT DOCUMENTS 7,657,898 B2   2/2010   Sadiq
8,261,295 B1   9/2012   Risbood et al.
(Continued)

OTHER PUBLICATIONS

International Search Report and Written Opinion for PCT/US2018/053167, dated Jan. 23, 2019, in 12 pages.
(Continued)

*Primary Examiner* — Frantz B Jean
(74) *Attorney, Agent, or Firm* — Knobbe, Martens, Olson & Bear LLP

(57) ABSTRACT

Systems and methods are disclosed for assisting with adoption or migration to a cloud-based system architecture. A system can include a network communications device and one or more hardware processors. The one or more hardware processors can create stack code from a code template, host a catalog of code templates including the code template, output identifiers for the catalog via a computer network for presentation, deploy the stack code to a server for use in preparing a virtual container, construct and launch a trial version of the virtual container from the stack code using the server, output training information via the computer network for presentation where the training information is associated with operations of the virtual container, monitor utilization of or performance associated with the virtual container, and output governance information via the computer network for presentation where the governance information is associated with the operations of the virtual container.

20 Claims, 25 Drawing Sheets

Related U.S. Application Data

(60) Provisional application No. 62/565,618, filed on Sep. 29, 2017.

(52) U.S. Cl.
CPC ............... *G06F 2009/4557* (2013.01); *G06F 2009/45595* (2013.01)

(58) Field of Classification Search
USPC ........................................................ 709/220
See application file for complete search history.

(56) References Cited

U.S. PATENT DOCUMENTS

| | | | |
|---|---|---|---|
| 9,052,933 | B2 | 6/2015 | Astete et al. |
| 9,307,019 | B2 | 4/2016 | Manglik et al. |
| 9,626,526 | B2* | 4/2017 | Hadar ................. G06F 21/6218 |
| 2014/0317293 | A1* | 10/2014 | Shatzkamer ........ G06F 9/45558 709/226 |
| 2014/0366155 | A1 | 12/2014 | Chang et al. |
| 2016/0182315 | A1 | 6/2016 | Salokanto et al. |
| 2016/0371127 | A1* | 12/2016 | Antony .................. G06F 9/505 |
| 2017/0228227 | A1* | 8/2017 | Winterfeldt ........... G06F 9/5072 |
| 2018/0295213 | A1 | 10/2018 | Ravichandran et al. |

OTHER PUBLICATIONS

"Introduction to Terraform," HashiCorp, dated Sep. 26, 2017, in 2 pages. https://www.terraform.io/intro/index.html.

"Managing Deployments," Cloud Launcher, Google Cloud Platform, dated Sep. 22, 2017, in 2 pages. https://cloud.google.com/launcher/docs/manage-deployments.

Singer, Brian, "One-Click Software Test Drives," Orbitera, now on GCP, dated Dec. 13, 2016, in 5 pages. https://www.blog.google/topics/google-cloud/one-click-software-test-drives-orbitera-now-gcp/.

"Orbitera: Automated Test Drives for Today's ISVs," Orbitera, dated Aug. 2017, in 2 pages.

"Terraform vs. Other Software," HashiCorp, dated Sep. 26, 2017, in 1 page. https://www.terraform.io/intro/vs/index.html.

"Use Cases—Terraform," HashiCorp, dated Sep. 26, 2017, in 2 pages. https://www.teraform.io/intro/use-cases.html.

"What is Google Cloud Launcher?" Cloud Launcher, Google Cloud Platform, dated Sep. 22, 2017, in 2 pages. https://cloud.google.com/laucher/docs/.

* cited by examiner

CHEF
Chef Automate
Published By: Chef

- Cloud Service for Deployment oracle
- Demo Lab Duration 2 Minutes
- Demo Lab Deployment Duration 2 Minutes
- Concurrency Limit: 5 Users at a time
- No. of trials per user: 5
- Call Back URL:

Last Deployment  Today ○ Running

Total Deployment
○ 05    ○ 35    ○ 10

▽ Activity

Activity                                                                               Timeline View ⊂⊃ Table View

| Status ∨ | ID# ⇅ | Customer ⇅ | Created On ⇅ | Updated On ⇅ | Deleted On ⇅ | Take Actions |
|---|---|---|---|---|---|---|
| ⊙ | 65817f69-3221-40e8-94e2-f9cc6500 | EXAMPLE USER | 9/6/2017, 8:57:13 AM | | | ⊙ |
| | 5e3fbc9f-bb57-43e3-b08e-ad8385cf | EXAMPLE USER | 9/5/2017, 5:16:41 AM | 9/6/2017, 4:25:29 AM | 9/5/2017, 5:20:11 PM | ⊙ |
| | 9fd44788-5875-480e-aca9-e6ee3adc | EXAMPLE USER | 9/5/2017, 3:17:28 AM | 9/6/2017, 4:24:22 AM | 9/5/2017, 3:21:11 PM | ⊙ |
| | 96b8b2e4-cd55-4570-99e8-f7c0bac5 | EXAMPLE USER | 9/5/2017, 11:25:29 AM | 9/6/2017, 4:25:37 AM | 9/5/2017, 11:29:10 AM | ⊙ |

Create Stack 1800

▼ Add Plan(s) — 1802

Name: Enter Plan Name
Description: Enter Plan Description
Type: Select Type ▷

Billing Interval: Select Interval ▷
Amount($): Enter Plan Amount
Trial Period(days): 0

⊕ ADD

| Name | Amount($) | Type | Billing Interval | Trial Period(days) |
|---|---|---|---|---|
| Billable | $1399 | recurring | month | 0 |
| Production Trial | $0 | free | NA | NA |

▼ Add Feature(s) — 1804

Name: Enter Feature Name
Description: Enter Feature Description

⊕ ADD

| | |
|---|---|
| Enhanced Network Integration | VCN Super Enhanced Network Integration Capability |

✎

Map plan(s), features(s), and project variable(s) — 1806

| Feature(s) | Billable | Production Trial |
|---|---|---|
| Enhanced Network Integration | ☑ | ☑ |

Project Variable(s)
| | | |
|---|---|---|
| 256GB | 50 | 50 |
| AD | 1 | 1 |
| BootStrapFile | -/userdata/bootstrap | -/userdata/bootstrap |
| InstanceImageOCID | {eu-frankfurt-1= ocid1 | {eu-frankfurt-1= ocid1 |

[SAVE AS DRAFT]    ⌄ Back to stack details    [PUBLISH]

FIG. 18

CREATE TRAINING LAB

2100

| Lab Manual | Lab Detail | Settings | Review and Publish |

Save As Draft and Exit ✕

Example User

Sections ⊕

Welcome
Section 1

Content ✕
Section 2

Section Details — 2102

Section Name
[Content]

Section Description
[Enter description here...]

Add Workspace — 2106
[Select workspace t... ▽]  [Enter Workspace Name]
⊕ Add workspace

Content Builder — 2104

ⓐ Enter Subsection title...

File▽ Edit▽ Insert▽ View▽ Format▽ Table▽ Tools▽
+ ▷ ⟲ ⟳ | Paragraph▽ | B  I  | 🅐▽ | ≡ ≡ ≡ ≡ | ≔ ≔ | I_x p Words: 0

FIG. 21

Welcome to Jump Start Learnings.

Self-Paced Labs for Oracle Cloud Infrastructure

The Oracle Cloud Infrastructure(OCI) Self-Paced Labs are 15-45 minute, task-based labs that provide detailed step-by-step directions for configuring and working with OCI services.

The labs are categorized by skill level:
- Beginner: for users with little to no experience with OCI or other cloud technologies
- Experienced: for users with some hands-on experience with OCI and knowledge of cloud technologies
- Advanced: for users with extensive experience on OCI and deployment scenarios in a cloud-based environment

[Visit Oracle University]  [More OCI Training]

For browser compatibility and support details, visit our help center

Filter By: [Select Skill level ▼]  [COMING SOON]  [AVAILABLE LABS]

Explore our Labs

2202 ◢Beginner
Creating Virtual Cloud Network (VCN) and Compute Instance
By: Umair Siddiqui
Create a Virtual Cloud network for your infrastructure.

2204 ◢Beginner
Creating and Attaching Block Volume Storage
By: Umair Siddiqui
Add Storage Capacity to a Compute Instance.

2206 ◢Beginner
Configuring Identity and Access Management(IAM) Service
By: Umair Siddiqui
Create users, groups, and define access policies for resources.

DEVICE COMMUNICATION AND MANAGEMENT IN COMPUTER DATA NETWORKS

CROSS-REFERENCE TO RELATED APPLICATIONS

This application is a continuation of International Patent Application No. PCT/US2018/053167, filed Sep. 27, 2018, which claims the benefit of U.S. Provisional Application No. 62/565,618, filed Sep. 29, 2017; the disclosures of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present disclosure is related to cloud-based systems.

Description of Related Art

Cloud-based systems have become increasingly prevalent and important. Accordingly, improvements to cloud-based systems and better approaches for handling cloud-based systems are desired.

SUMMARY

In some embodiments, a system is disclosed for assisting with adoption or migration to a cloud-based system architecture. The system can include a network communications device configured to communicate via a computer network and one or more hardware processors in communication with the network communications device. The one or more hardware processors can: create stack code from a code template, host a catalog of a plurality of code templates including the code template, output identifiers for the catalog via the computer network for presentation on a first user interface, deploy the stack code to a server for use in preparing a virtual container, construct and launch a trial version of the virtual container from the stack code using the server where the virtual container is accessible via the computer network, output training information via the computer network for presentation on a second user interface where the training information is associated with operations of the virtual container, monitor utilization of or performance associated with the virtual container, and output governance information via the computer network for presentation on a third user interface where the governance information is associated with the operations of the virtual container. A method of using the system is also disclosed.

In some embodiments, a method is disclosed for configuring multiple infrastructure deployments across a computer network and enabling trials of the multiple infrastructure deployments. The method can include: receiving, by a network communications device, a first deployment request and a second deployment request via a computer network; using a code template, constructing, by one or more hardware processors, a first virtual container responsive to the first deployment request and a second virtual container responsive to the second deployment request; initiating, by the one or more hardware processors, performance of processing requested by the first virtual container and the second virtual container and of servicing input and output requests for the first virtual container and the second virtual container without permitting communication between the first virtual container and the second virtual container; determining, by the one or more hardware processors, that the first virtual container is running a trial deployment from a configuration of the first virtual container and that the second virtual container is not running the trial deployment from a configuration of the second virtual container; restricting, by the one or more hardware processors, a function in the first virtual container without restricting the function in the second virtual container responsive to determining that the first virtual container is running the trial deployment and that the second virtual container is not running the trial deployment; and deconstructing, by the one or more hardware processors, the first virtual container and the second virtual container so that the first virtual container and the second virtual container are no longer accessible.

The method of the preceding paragraph can include one or more of the following features: The constructing the first virtual container and the second virtual container can include configuring a first infrastructure of a first cloud provider for the first virtual container and a second infrastructure of a second cloud provider for the second virtual container, the first cloud provider being different from the second cloud provider. The method can further include revising, by the one or more hardware processors, the code template responsive to user inputs. The code template can include infrastructure as code that defines virtual datacenter infrastructure. The code template can be written in a structured format. The first deployment request and the second deployment request can be received from a plurality of end user systems, and the method can further include opening, by the one or more hardware processors, sockets to the first virtual container and the second virtual container so that the first virtual container and the second virtual container transmit logs of end user activity in the first virtual container and the second virtual container to a plurality of configuration user systems. The first deployment request and the second deployment request can be respectively received from a first end user system and a second end user system different from the first end user system, and the method can further include outputting, by the one or more hardware processors, a first user interface for the first virtual container for presentation by the first end user system and output a second user interface for the second virtual container for presentation by the second end user system. The first user interface can be different from the second user interface. The deconstructing the first virtual container and the second virtual container can be performed responsive to one or more user inputs received via the computer network from one or more configuration user systems. The restricting the function in the first virtual container can include limiting a usability of the first virtual container to a trial duration. The trial duration can be no more than 30 days, 10 days, 5 days, 3 days, 2 days, 1 day, 8 hours, 4 hours, 2 hours, or 1 hour.

In some embodiments, a system is disclosed for configuring multiple infrastructure deployments across a computer network and enabling trials of the multiple infrastructure deployments. The system can include a network communications device and one or more hardware processors. The network communications device can communicate via a computer network and receive a first deployment request and a second deployment request via the computer network. The one or more hardware processors can be in communication with the network communications device. The one or more hardware processors can: using a code template, construct a first virtual container responsive to the first deployment request and a second virtual container responsive to the second deployment request, initiate performance of processing requested by the first virtual container and the second virtual container and servicing of input and output requests for the first virtual container and the second virtual container without permitting communication between the first virtual container and the second virtual container, determine that the first virtual container is running a trial deployment from a configuration of the first virtual container and that the second virtual container is not running the trial deployment from a configuration of the second virtual container, restrict a function in the first virtual container without restricting the function in the second virtual container responsive to determining that the first virtual container is running the trial deployment and that the second virtual container is not running the trial deployment, and deconstruct the first virtual container and the second virtual container so that the first virtual container and the second virtual container are no longer accessible.

The system of the preceding paragraph can include one or more of the following features: The one or more hardware processors can use the code template to configure a first infrastructure of a first cloud provider for the first virtual container and a second infrastructure of a second cloud provider for the second virtual container, the first cloud provider being different from the second cloud provider. The one or more hardware processors can revise the code template responsive to user inputs. The code template can include infrastructure as code that defines virtual datacenter infrastructure. The first deployment request and the second deployment request can be received from a plurality of end user systems, and the one or more hardware processors can open sockets to the first virtual container and the second virtual container so that the first virtual container and the second virtual container transmit logs of end user activity in the first virtual container and the second virtual container to a plurality of configuration user systems. The first deployment request and the second deployment request can be respectively received from a first end user system and a second end user system different from the first end user system, and the one or more hardware processors can output a first user interface for the first virtual container for presentation by the first end user system and output a second user interface for the second virtual container for presentation by the second end user system. The one or more hardware processors can deconstruct the first virtual container and the second virtual container responsive to one or more user inputs received via the computer network from one or more configuration user systems. The one or more hardware processors can restrict the function in the first virtual container by limiting a usability of the first virtual container to a trial duration. The trial duration can be no more than 30 days, 10 days, 5 days, 3 days, 2 days, 1 day, 8 hours, 4 hours, 2 hours, or 1 hour.

BRIEF DESCRIPTION OF THE DRAWINGS

FIG. 18 illustrates a stacks configuration user interface that may be presented in the computing environment of FIG. 1.

FIG. 21 illustrates a training creation user interface that may be presented in the computing environment of FIG. 1.

FIG. 22 illustrates a training end user main user interface that may be presented in the computing environment of FIG. 1.

FIGS. 24 and 25 illustrate training end user session user interfaces that may be presented in the computing environment of FIG. 1.

DETAILED DESCRIPTION

I. Introduction

Figure 1:
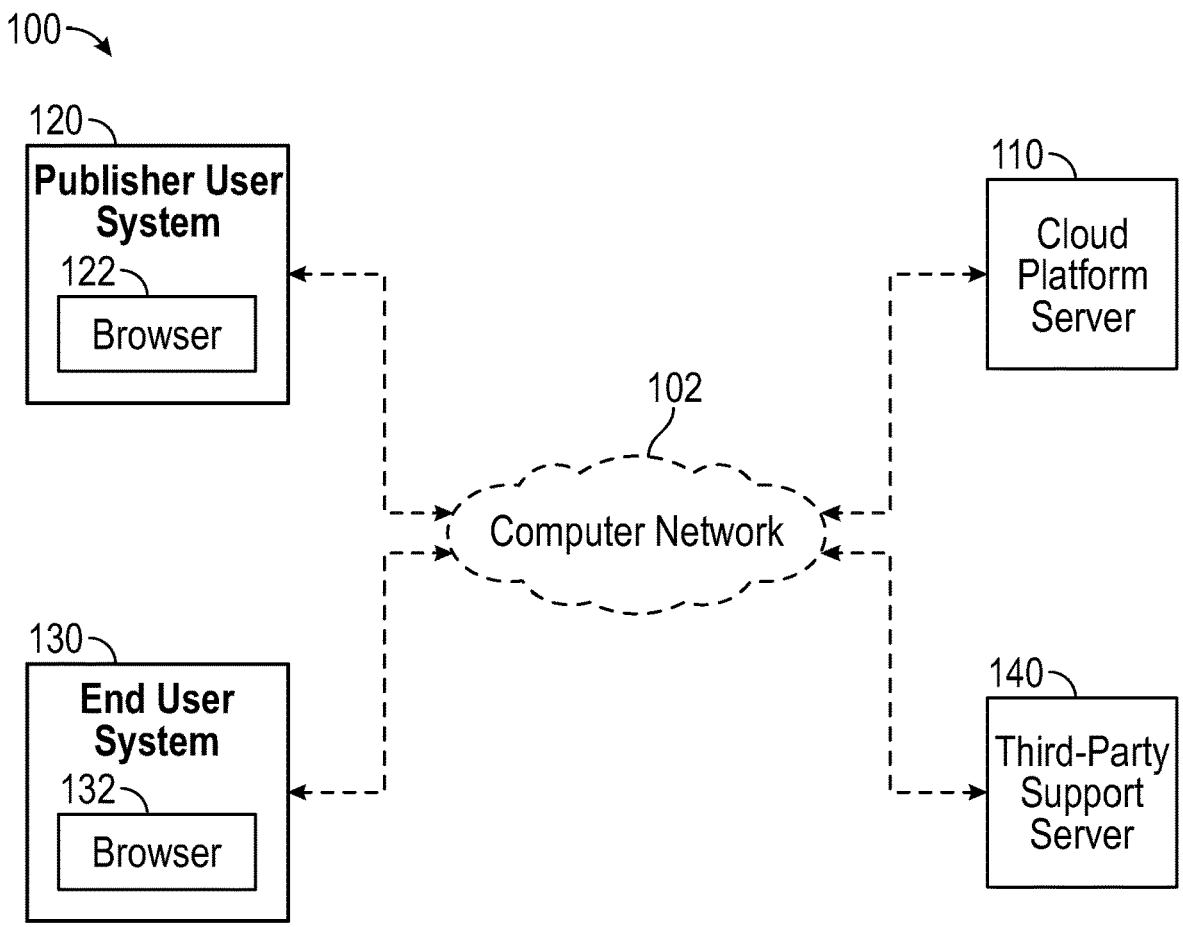
FIG. 1 illustrates a computing environment that includes a cloud platform server, a publisher user system, an end user system, and a third-party support server.

Despite the numerous benefits of cloud-based systems, many companies choose not to adopt, delay adoption, or limit adoption of cloud-based technologies because of the difficulties associated with cloud-based technologies. Cloud-based technologies can be fraught with complexity, lack of comprehensive tools, integration issues, cultural hurdles, long adoption cycles, or scarcity of qualified resources, among other problems.

The software platform (sometimes referred to simply as a "platform") described herein and its associated features can provide customers, independent software vendors (ISVs), and systems integrators (SIs) with a comprehensive set of tools and services to seamlessly embark on and navigate a cloud adoption (and migration) journey from beginning to end. The platform can enable businesses to flexibly and responsively operate in today's outcome-driven economy and allow adoption of processes that may be plugged into quickly and may be delivered as a service to customers, partners, or employees. The platform can permit flexibility to initiate quickly, charge just for services used, discern quickly what is working or not working, deliver solutions at various scales, or continue driving innovation.

The platform can help with successful adoption of a cloud strategy that suits particular specifications. The platform can be a Software as a Service (SaaS) platform that may play a role in a set of tools or services that can assist in a cloud adoption process, from beginning to end. The platform can moreover be cloud agnostic and work for all major cloud providers, including Amazon Web Services™ (AWS), Microsoft™ Azure™, Google Cloud Platform™ (GCP), and Oracle™ Cloud Infrastructure (OCI). As a result, the platform can, in certain embodiments, offer seamless transitions between the states or phases of a cloud journey, accelerate the cloud journey, and provide a one stop shop for cloud adoptions.

The platform can be composed of an ecosystem of integrated subsystems that work collaboratively with a cloud adoption strategy to effortlessly help with the adoption process. Customers can use the platform from a start of the cloud adoption process to a finish of the adoption process or leverage individual components of the platform separately as desired to perform specific tasks along the adoption process. The platform can assist customers with envisioning a cloud journey, such as based on the customer's strategic plans, so that the customers may be confident that the platform will assist in each step of the adoption process.

The platform can facilitate making the cloud journey into a service that can be offered by an ISV and exposed to customers. For example, customers can try out the service offered by an ISV prior to moving to a production-ready implementation of a cloud solution with the platform. This can allow customers to flexibly explore and experiment with cloud solutions. The platform may permit such trials through a trial subsystem, which can enable product or service vendors to publish demos or trials for customers to consume or test in a controlled cloud environment through the platform. Customers can use the platform to the login, register, deploy trials, consume promotional or informational content, or contact partners for more product or services information, among other features. As other examples, the platform can enable product or service vendors to set up stacks, training, or governance for products or services under a management console of the platform, so customers can quickly adopt and accelerate the cloud journey. Accordingly, the platform can include one or more features or subsystems that work together to form the cloud journey for customers.

ISVs may utilize the platform to monitor products or services offered by the ISV and to collect information, such as real time logs, related to their products and services. With this monitoring and collected information, the ISVs can derive valuable feedback useful for helping to enhance their products and services.

The platform can launch multi-cloud deployments through various infrastructure as code formats, such as Terraform™ or Azure™ Resource Manager (ARM) templates, and provide real-time logs across deployments. Such features individually or together can desirably, in certain embodiments, reduce the friction experienced by customers during a cloud journey and accelerate the cloud journey.

The platform can be used to transform infrastructure as a code from one format to other format. In one example, the platform can transform an ARM template at run time to an Azure™ Terraform™ template or an AWS Terraform™ template. Moreover, the platform can utilize a natural language description of infrastructure or prepare or develop an infrastructure network and architecture diagram. Code can be converted by the platform to a normalized format and then the platform may use an algorithm, such as a machine learning algorithm, to build out the code in a particular format.

The platform can further include one or more of the following features: The platform can launch multiple clouds deployments through carious infrastructure as code formats, such as Terraform™ or ARM templates. The platform can allow custom cascading style sheets (CSS) styling to enable per tenant customizations. The platform can be a Terraform™ deployment platform. The Terraform™ platform can provide services to publishers or customers through in-application support that may be driven by humans and assisted with bots. The platform can provide extensibility through out-of-the-box extensions using a third party service, which may allow customers to extend platform features as desired without updates being made to the platform. The platform can provide real-time logs across deployments so that customers may track progress of deployments. Leads generated by the platform can be integrated into multiple third party platforms through extensions. Pause and resume functionality, such as in a demo lab, can be supported for certain templates like Docker™ Compose templates. The platform can permit publishers to write code in one format for a particular cloud provider and then later run the code on another or any other cloud provider. The platform can include collaboration features that allow publishers to share a demo lab with users, teams, or other tenants. A review system managed by the platform can allow customers to provide feedback to the publishers on demo labs and issues with solutions. The platform can collect data about how customers may be using a demo lab and pain points in the use so that publishers may improve their products as well as the overall user experience.

II. System Overview

FIG. 1 illustrates a computing environment 100 that includes a cloud platform server 110, a publisher user system 120, an end user system 130, and a third-party support server 140. The computing environment 100 can support cloud services provided by cloud publishers for end user customers.

A cloud publishers can configure and monitor the cloud services provided by the cloud platform server 110 by a user interface presented on a browser 122 (or another application) of the publisher user system 120. The browser 122 can navigate to a publisher address operated by the cloud platform server 110 and begin communicating with the cloud platform server 110 via the computer network 102 at the publisher address. The publisher user system 120 can communicate instructions received by the user interface via the network 102 to the cloud platform server 110, which can implement the instructions. The cloud platform server 110 can communicate status information to the publisher user system 120 so that the publisher user system 120 can present activity information in the browser 122 about cloud services provided by the cloud platform server 110 for the cloud publishers. Although a single publisher user system is illustrated in FIG. 1, multiple publisher user systems can be used to communicate with the cloud platform server 110.

An end user can access the cloud services provided by the cloud platform server 110 using a browser 132 (or another application) of the end user system 130. The browser 132 can navigate to an end user address operated by the cloud platform server 110 and begin communicating with the cloud platform server 110 via the computer network 102 at the end user address. The cloud platform server 110 can, for instance, provide cloud services to the end user on behalf of the cloud publisher as described herein.

The third-party support server 140 can collect data for or otherwise provide processing support for the cloud platform server 110 or the end user system 130. The third-party support server 140 can be part of a cloud infrastructure and used or controlled by the cloud platform server 110 to execute code, such as to run deployments, solutions, or the like described herein. The third-party support server 140 can, in one example, provide additional functionality beyond a functionality of the cloud platform server 110 and thus afford additional features.

Figure 2:
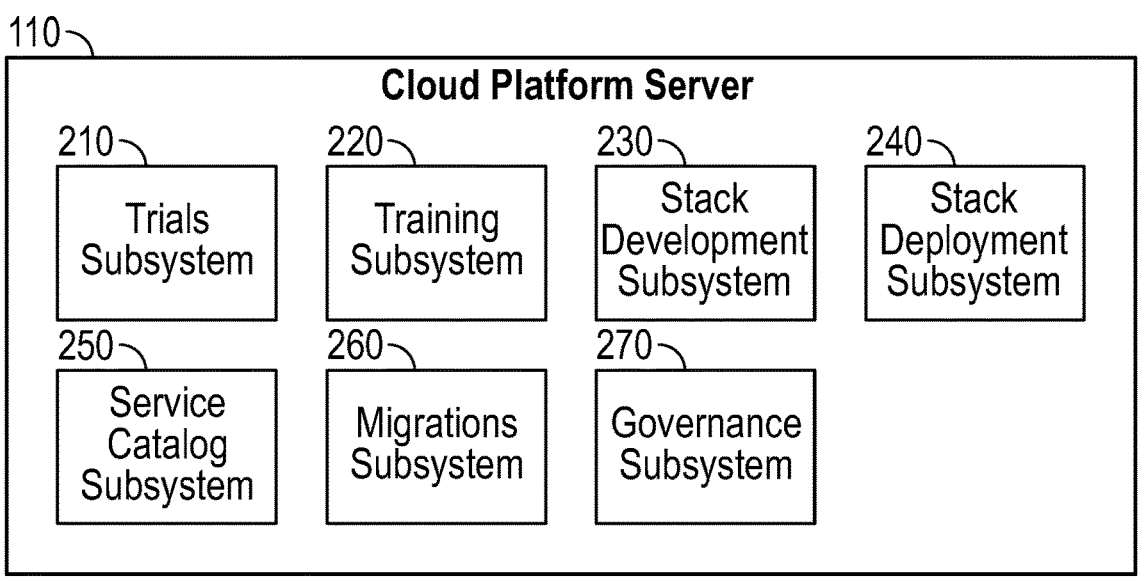
FIG. 2 illustrates subsystems of the cloud platform server of FIG. 1.

FIG. 2 illustrates subsystems of the cloud platform server 110. As can be seen, the cloud platform server 110 can include a trials subsystem 210, a training subsystem 220, a stack development subsystem 230, a stack deployment subsystem 240, a service catalog subsystem 250, a migration subsystem 260, and a governance subsystem 270. In some implementations, the cloud platform server 110 may include fewer subsystems or additional subsystems not shown.

The trials subsystem 210 can be used to envision a solution for an existing business problem or a new business opportunity. The trials subsystem 210 can enable a customer to see a demos of a component that may make up the solution. The trials subsystem 210 can provide a platform for a product or service vendor to publish demos or trials and for customers to consume the demos or trials. Example interfaces for interacting with the trials subsystem 210 are described with respect to FIGS. 4 and 6-12.

The trials subsystem 210 can launch solutions as trials in controlled environments, such as on the third-party support server 140. A trial in this context may be a cloud environment where a solution may be running and can be accessed by a potential customer for a period of time, which may be predetermined, after which the cloud environment may terminate. The trial can be considered a demo as the trial may come with a pre-determined use case scenario and may give an end user a set amount of time to try out a solution offered by the trial. The trial may have limitations on particular features so that the trial includes reduced features relative to a non-trial solution. End user information may be collected by the trials subsystem 210 for marketing purposes, and the trials subsystem 210 may collect or manage the end user information in accordance with personally identifiable information (PII) standards or another security policy. The trial may not be considered a production-ready solution.

The trials subsystem 210 can provide partners with a way to register, publish, promote, control, monitor, or manage a trial version of their solutions. For end users and customers who want to demo the products or services, the trials subsystem 210 can provide an approach to login/register, deploy trials, consume promotional or informational content, or contact partners for more product or services information.

The trials subsystem 210 can, moreover, include or provide one or more of easy onboarding of solutions to the trials subsystem 210, billing integration, lead management, publishing pipeline for test drives, intuitive customer experience, customizable user interface, scalable deployments of test drives, enterprise marketplace, artificial intelligence driven chat support, pause and play control for trials, or multi-cloud adaption or management.

The training subsystem 220 can provide a way to publish, offer, consume, or track training of all types and categories of could solutions handled by the cloud platform server 110. The training subsystem 220 can, depending on a particular user (for example, publisher, consumer, or enterprise) publish, launch, or subscribe to cloud training solutions or related topics in an easy to use or consume setting. The training subsystem 220 can be a cloud-based environment where content publishers can publish and content consumers consume targeted training. A training session by the training subsystem 220 can be self-paced or instructor led or augmented with user manuals, slides, media (for example, video or audio), or other materials to enhance the training session. Example interfaces for interacting with the training subsystem 220 are described with respect to FIGS. 20-25.

The training subsystem 220 can be used by publishers to envision or plan their training offers or publish the training offers to the training subsystem 220 using an associated published identifier or account information. Consumers of training sessions of the training subsystem 220 can enroll for specific training offers and complete the training at their own pace. Customers may obtain training credits and distribute the training credits to employees. The employees may, in turn, be trained and that a progress of the employee training may be monitored by the training subsystem 220 and shared with the customer.

The training subsystem 220 can provide features that impact on how quickly or effectively relevant stakeholders involved with various aspects of a cloud journey, such as stack development, deployment or migrations, are trained on solutions to deliver results. Moreover, the training subsystem 220 can be used by customers to train a sales team, for instance, on how to market or sell a company's product or services successfully.

The training subsystem 220 can, moreover, include or provide one or more of creation or management of training schedules, launch hands on lab (HOL) for solution stacks, customer resource management (CRM) integration to market to leads, or support system for self-learning or instructor-led training.

The stack development subsystem 230 can create solution stacks based on an infrastructure as a code process and may provide multiple ways of developing the solution stacks. The stack development subsystem 230 can provide a user interface that may be used to build a solution via draft and drop mechanism. The stack development subsystem 230 can support a natural language description paradigm, such as via scripting, for describing a stack that may then be validated based on various cloud provider marketplace offerings to ensure the stacks are current and correctly operating. The stack development subsystem 230 can integrate with a third-party server, such as the third-party support server 140, to translate code into a template in a cloud-agnostic way.

Additionally or alternatively, the stack development subsystem 230 can convert architectural images into a template that can be successfully deployed.

The stack development subsystem 230 can build cloud solutions or provide source code management or a continuation integration process for infrastructure, such as the third-party support server 140. The stack development subsystem 230 can deliver unit testing, static code analysis, functional testing, or provide pipeline customizations.

The stack development subsystem 230 can, moreover, include or provide one or more of simplify creation of infrastructure as a code templates (for instance, through a simplified user interface, natural language description, or conversion from image to template), conversion between different formats (for instance, text, image, json), support chat, integration for development, marketplace validations, third-party service or server code integration for supply chain management (SCM), continuation integration of infrastructure as code (for instance, unit testing support with out of box tests using structured natural language, static code analysis using structured natural language, build infrastructure as code, functional test support using declarative language, continuous integration pipelines, or execution or reporting of pipelines), cloud transformations (for instance, artificial intelligence assisted infrastructure as code transformations), issuance of remediation with artificial intelligence integration, or integration with third-party artificial intelligence tools (for instance, Visual Studio Team Services (VSTS), Jenkins™, CircleCI™, or Chef Automate™).

The stack deployment subsystem 240 can be used to facilitate deployment of infrastructure as code solutions, which may have been build using the stack development subsystem 230, to a cloud provider, such as a provider that may be selected by a customer. The deployments can be integrated into a continuous deliver or deployment cycle of existing pipelines.

The stack deployment subsystem 240 can deploy cloud solutions as an idempotent task to a cloud provider, such as the third-party support server 140. A deployment can be managed with gates at one or more individual stages, such as development, testing, staging, or production cycles. An approval gate or time base gate can be provided as part of the stack deployment subsystem 240. A deployment can be governed by a set of common rules or integration (for example, smoke) tests. A deployment pipeline for the stack deployment subsystem 240 can be customized and executed as many times as may be desired before a deployment may be pushed to a particular cloud provider.

The stack deployment subsystem 240 can provide partners or customers a way to build or manage deployment pipelines or ensure gating, control, or testing based on specific rules or policies to ensure secure and reliable deployments.

The stack deployment subsystem 240 can, moreover, include or provide one or more of management of a deployment pipeline with gates (such as at development, staging, production, or the like), execution of a deployment pipeline, functional integration or smoke test support, common rules, approval or time-based gates, support for Azure™, integration with security tools, infrastructure compliance automation (such as using Chef Automate™ integration), Azure™ Internet of Things based rule set, support for Oracle™, vertical industry based rules, library of rules, or support for other clouds.

Example interfaces for interacting with the stack development subsystem 230 or the stack deployment subsystem 240 are described with respect to FIGS. 15-19.

The service catalog subsystem 250 can provide one or more catalogs of solutions that customers can turn to for speeding up a cloud journey. The catalogs can each be a platform to which SIs or ISVs can build or publish their own catalogs for customers to consume. The catalogs may be tested or validated by partners or backed by a well-defined support plan. The solutions of the catalogs can be secure and reliable and may be offered as building blocks to accelerate the cloud journey.

The service catalog subsystem 250 can provide a central repository for publishing, browsing, or consuming catalogs, depending on a user profile. For consumers, the service catalog subsystem 250 can offer a user interface that can be used to browse one or more catalogs and pick the solutions that the consumers want and deploy the solutions using the stack deployment subsystem 240. For catalog publishers, solutions can be built or tested using the stack development subsystem 230 prior to publication of the solutions to the service catalog subsystem 250.

The service catalog subsystem 250 can, moreover, include or provide a service catalog of templates or associated continuous integration or continuous delivery pipelines (for example, security enablers, development and operations, monitoring and management, big data solutions, governance solutions, common enterprise grade application stacks, industry-based solutions, or enhance and library). The service catalog subsystem 250 can provide access to its one or more catalogs to a limited group over users (privately), any users (publicly), or white labeled.

The service catalog subsystem 250 may enable ISVs, SIs, or managed service providers (MSPs) to attach pricing or monetization objects to one or more catalogs or solutions to facilitate selling. The service catalog subsystem 250 can allow ISVs, SIs, or MSPs to (i) set price plans, feature plans, or support plans, such as is illustrated with respect to FIG. 18, (ii) set customer pricing or discounts, (iii) set customer-based pricing, (iv) sell intellectual property or a public cloud space or access as a packaged offering, or (v) report or integrate with the governance subsystem 270.

The migration subsystem 260 can provide an end-to-end migration platform for migrating workloads to a cloud provider of choice. The migration subsystem 260 can include a set of tools or services to allow customers or partners to discover, assess, score, validate, or migrate to the cloud in an optimized fashion. The set of tools can provide performance matrices for before or after migrations, offer Infrastructure as a Service (IaaS) to IaaS and Platform as a Service (PaaS) migrations, or incorporate container-based solutions. The set of tools can allow migration between public cloud providers and provide cost optimization options and visibility into cloud-related spending. Moreover, the migration subsystem 260 can provide customers or partners a set of tools or services to undertake a migration project with a high level of confidence and drive the migration project to a successful completion.

The migration subsystem 260 can, moreover, include or provide one or more of a single tool to handle multiple features (for example, discover, assess cloud suitability, migration planning, migration implementation, or monitoring), performance of comparison before or after migrations, cost optimization or visibility, migration to Azure™ virtual machines (VMs), migration to Docker™ containers, cloud solution provider (CSP) multitenant support, or migration between clouds.

Once workloads have been moved to a cloud or new cloud-native solutions may built, the governance subsystem 270 can be used to help the solutions meet various standards.

The governance subsystem 270 can consistently or repeatedly monitor or govern to ensure that compliance standards, which may be set by internal or external regulations, may be met by applications, services, or infrastructure that may be run or managed by the cloud platform server 110.

The governance subsystem 270 can include a dashboard for publishing or visualizing workload or application governance data, depending on a user profile (for instance, administrator, power user, delegate, finance lead, or the like). The governance subsystem 270 can enhance monitoring or governance of workloads by providing a centrally-managed or role base access control enabled (RBAC-enabled) tool to help ensure governance can be achieved.

The governance subsystem 270 can, moreover, include or provide one or more of application performance management (APM), infrastructure monitoring, container monitoring, cloud solution provider level monitoring details, cost governance, or policy governance.

The cloud platform server 110 can include security or management features as part of its subsystems or in the interfaces between one or more of its subsystems. The cloud platform server 110 can manage users, payments, or publication of content. The trials subsystem 210 may secure trials by sandboxing or providing red listing capabilities. The stack development subsystem 230 or the stack deployment subsystem 240 can run vulnerability scans, which may be assisted or automated by artificial intelligence or machine learning. Moreover, the stack development subsystem 230, the stack deployment subsystem 240, or the migration subsystem 260 can be hardened through assistance of or automation by artificial intelligence or machine learning.

The cloud platform server 110 can enable a publisher to create selectable or customizable solutions that include one or more of the subsystems of the cloud platform server 110. Moreover, the cloud platform server 110 may, in response to a request to accept a project, automatically select or customize solutions using machine learning or artificial intelligence. The cloud platform server 110 accordingly can deploy a cloud journey as a service to one or more subsystems of the cloud platform server 110 with machine learning or artificial intelligence so that the one or more subsystems can be quickly prepared and nearly or entirely complete in a draft mode. This can be in contrast to other systems where, for instance, three user interfaces may be used to publish demos, stacks, and training under the same platform or using application programming interfaces (APIs). The automation of the cloud platform server 110 can be deployed to facilitate the consumption of solutions in different product formats (such as demos, stacks, or training) under a centralized, secured management platform. This can help the consumer of the services to ease and accelerate their adoption of the cloud, as well as accelerate the publication and consumption of content.

III. System Features

The cloud platform server 110 can build dynamic software containers at run time for customers. The containers can provide a separate environment for each deployment so that the environments for the deployments are secure. For example, if a deployment request comes in, the cloud platform server 110 can, for instance together with the third-party support server 140, provide separate isolated environments for each deployment so that the environments do not mix or have access to one another. The environments can be available for a duration of deployment and then may be deleted. This advantageously can, in certain embodiments, enable isolation of code for different publishers for different deployments.

The cloud platform server 110 can receive infrastructure as code templates, such as templates written in a structured format, such as Terraform™ by HashiCorp™, that may be usable to configure infrastructure for multiple different cloud providers. This structured format can contrast with specific code language that may otherwise be used to individually configure resources for each different cloud provider. The cloud platform server 110 can also receive infrastructure as code templates that may not be written in a common structured format. The cloud platform server 110 thus may provide support for different platform as a service (PaaS) or infrastructure as a service (IaaS) offerings, such as AWS cloud formation, Azure™, or ARM technologies. A particular code template can, for instance, define that a resource like a virtual machine be deployed in particular region of a cloud, such as a certain private cloud. The particular code template can then be processed and converted to specific application programming interfaces (APIs) suitable for running on selected hardware and be used for orchestrating deployment of the particular code template.

Each instantiation of a deployment by the cloud platform server 110 can be unique. If one deployment initiates, the one deployment can be run by a server, such as the third-party support server 140, until the deployment is completed and then made available again upon completion.

The cloud platform server 110 can desirably, in certain embodiments, containerize deployments by storing data (for instance, objects) in an organized way that follows specific access rules. When a new deployment request is received from a user system, the cloud platform server 110 can create a new deployment responsive to the request and manage the new deployment within a software container (sometimes referred to simply as a "container" or "virtual container"). The container can be used to contain processing for the deployment and service input and output requests. The same code templates, such as Terraform™ or ARM templates, can apply within the container. In one example, 100 deployment requests can be received by the cloud platform server 110, and the cloud platform server 110 can accordingly construct 100 containers that are split up from one another and one container for each deployment. Each container can be isolated from the other containers. The cloud platform server 110 may deploy as many containers as deployment requests are received. The cloud platform server 110 can maintain the containers, keep the containers alive for the duration of deployment, communicate status information about containers during deployment, and delete the containers once a deployment is completed. The cloud platform server 110 can advantageously, in certain embodiments, construct multiple instances of one or more code templates rather than a single instance.

The cloud platform server 110 can allow publishers to review information about deployments to create a feedback loop for enhancing the publishers' deployments. The cloud platform server 110 can stream, such as in real-time with customer use, logs that detail activity related to deployments. The logs can be provided by sockets open to the containers maintained by the cloud platform server 110 to stream back the logs. The sockets may or may not provide dedicated connections for the logs. The logs may, in some implementations, additionally or alternatively be provided by the cloud platform server 110 via polling rather than streaming via an open socket. The logs can, in turn, be exposed out to a browser of the publishers or another end point, such as through a third-party service that processes the logs for the publishers.

IV. Communications and User Interfaces

Figure 3:
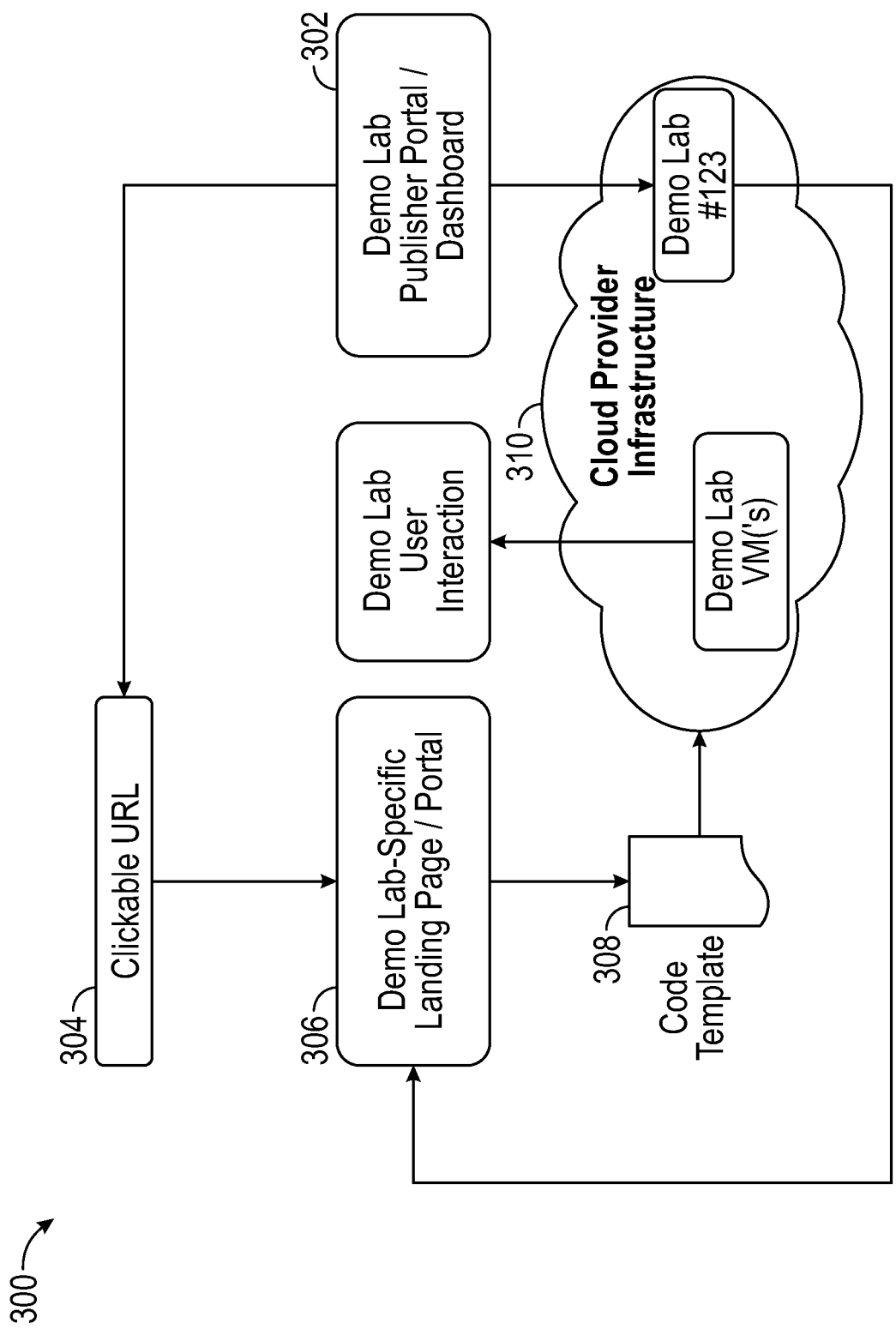
FIG. 3 illustrates communications in the computing environment of FIG. 1.

FIG. 3 illustrates communications 300 in the computing environment 100 of FIG. 1. The communications 300 can include a demo lab published portal/dashboard 302 being used to create a particular demo (for example, Demo Lab #123) that can be accessed via a web address, such as a uniform resource locator (URL) specified by Clickable URL 304. The publisher user system 120 may have constructed the demo lab published portal/dashboard 302 via communication with the cloud platform server 110. Upon selection of the web address by the end user in the browser 132 of the end user system 130, the browser 132 can navigate to a demo lab-specific landing page/portal 306 provided by the cloud platform server 110 that may trigger configuration of the particular demo via a code template 308, such as a Terraform™ or ARM template. The particular demo can then be instantiated in virtual machines of the cloud provider infrastructure 310, such as AWS, Microsoft™ Azure™, GCP, and OCI, which can be an implementation of the third-party support server 140, in response to deployment requests from end users and may be presented to end users as a demo lab user interaction, such as via the browser 132 of the end user system 130.

Figure 4:
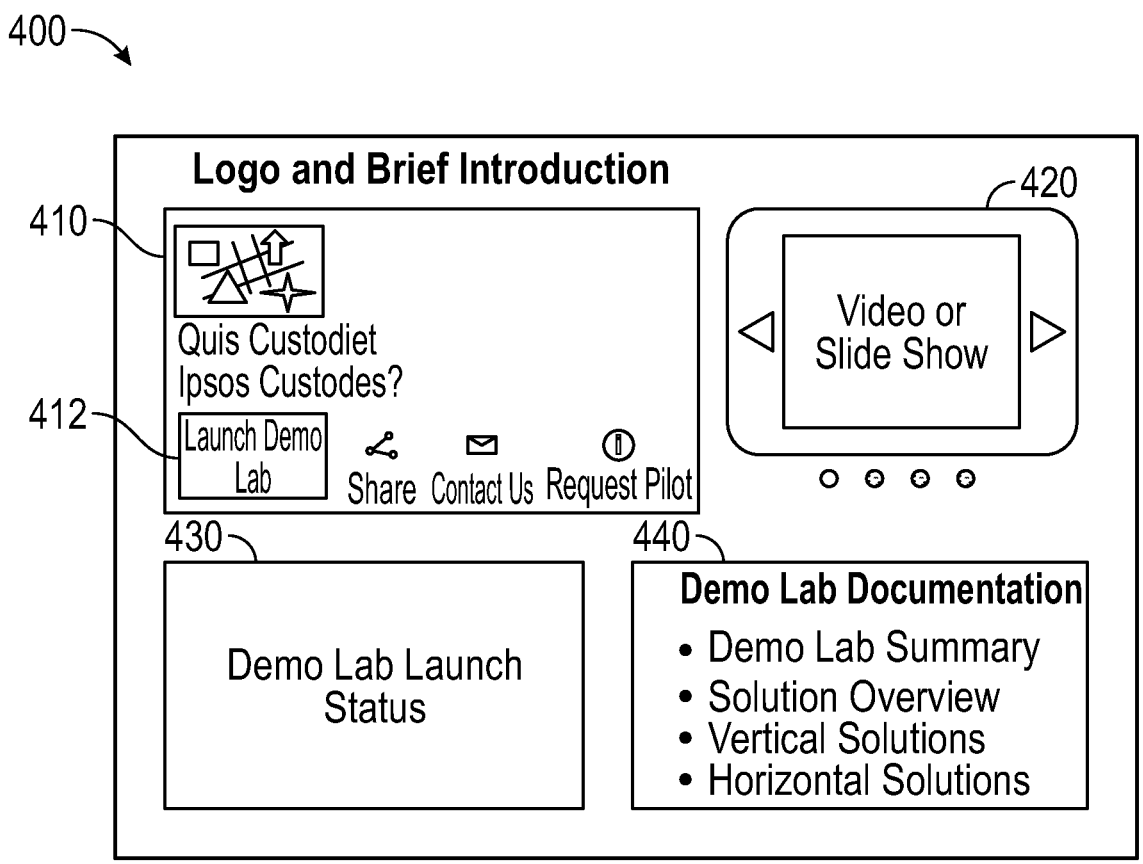
FIG. 4 illustrates an end user interface that may be presented during the communications of FIG. 3.

FIG. 4 illustrates an end user interface 400 that may be presented during the communications 300 of FIG. 3. In particular, the end user interface 400 can be presented to the end user on the browser 132 of the during the demo lab user interaction, such as when the end user selects the web address in the browser 132. The end user interface 400 may have been output by the cloud platform server 110 to the end user system 130 for presentation.

The end user interface 400 can include a control area 410, a promotional area 420, a launch status area 430, and a documentation area 440 that may be separate from one another. The control area 410 can present introductory information about the demo lab, as well as provide navigational tools such as a button 412 selectable to launch the demo lab or other selectable icons for sharing the demo lab, contacting a provider of the demo lab, or requesting a pilot of the demo lab. The promotional area 420 can present one or more videos or slide shows associated with the demo lab. The launch status area 430 can present a current launch status for the demo lab. The documentation area 440 can provides navigable links to documentation for the demo lab, such as a demo lab summary, a solution overview, vertical solutions information, or horizontal solutions information.

Figure 5:
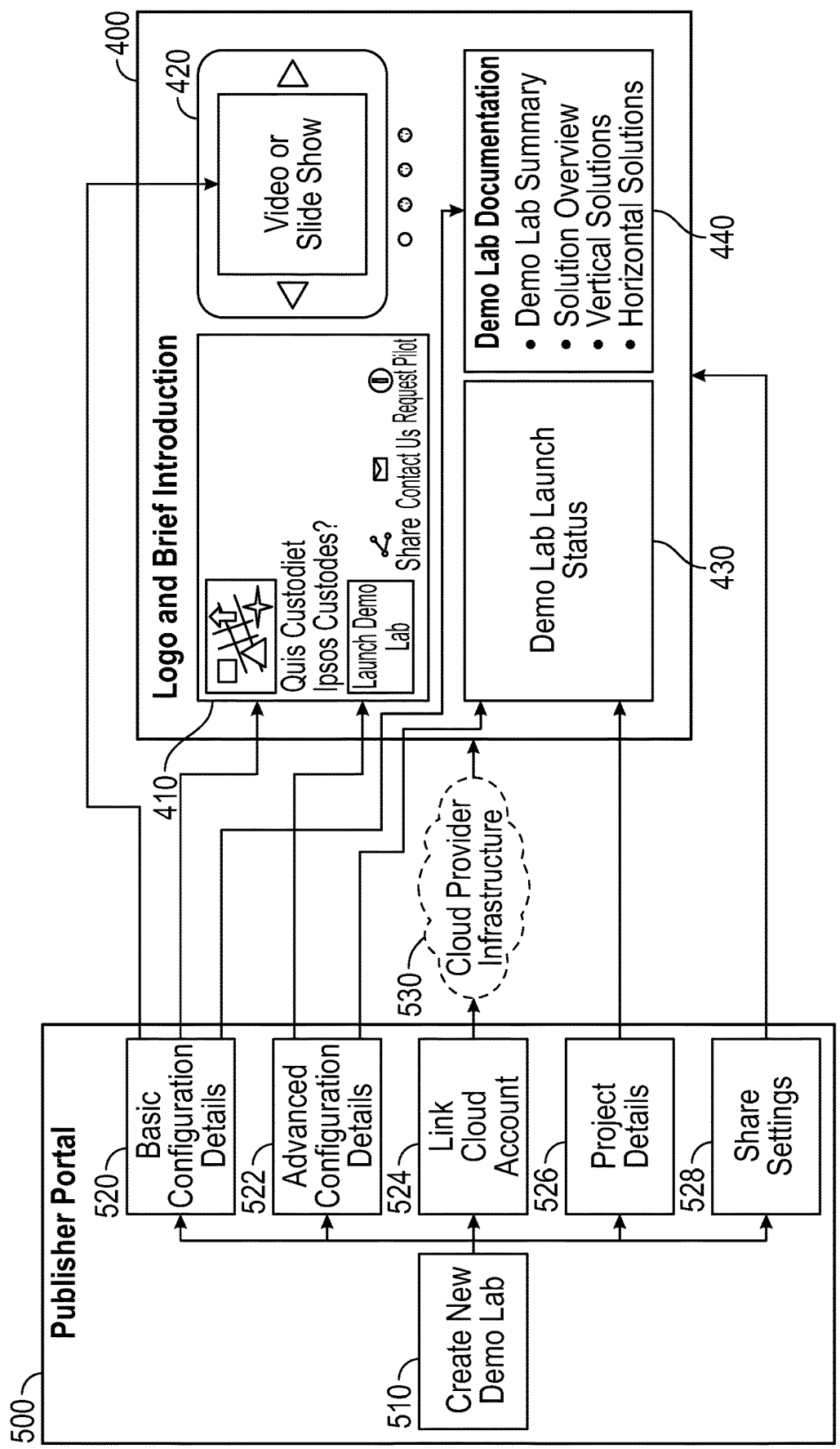
FIG. 5 illustrates a process flow performable by a publisher portal during the communications of FIG. 3.

FIG. 5 illustrates a process flow performable by a publisher portal 500 during the communications 300 of FIG. 3. In particular, the publisher portal 500 can be an example implementation of the cloud platform server 110 or the demo lab published portal/dashboard 302 and their features for creating a demo lab.

The process flow can be initiated at block 510 with creation of the new demo lab, which may be triggered by a publisher user via the browser 122. From block 510, the process flow can transition to blocks 520, 522, 524, 526, 528.

At block 520, the process flow can request and receive basic configuration details for the demo lab from publisher user via the browser 122. The basic configuration details can be used to configure settings, information, or display of at least the control area 410, the promotional area 420, or the documentation area 440.

At block 522, the process flow can request and receive advanced configuration details for the demo lab from the publisher user via the browser 122. The advanced configuration details can be used to configure settings, information, or display of at least the control area 410 or the launch status area 430.

At block 524, the process flow can facilitate creation or linking of a cloud account for the demo lab by the publisher user via the browser 122. The cloud account may service the deployment of the demo lab. The cloud account can be used to link to a cloud provider infrastructure 530, which can be an example implementation of the cloud provider infrastructure 310, for presentation of the demo lab.

At block 526, the process flow can request and receive project details for the demo lab from publisher user via the browser 122. The project details can include creation or selection of existing projects via a third-party service or uploading of a project file. The project details can be used to configure settings, information, or display of at least the launch status area 430.

At block 528, the process flow can request and receive share settings for the demo lab from the publisher user via the browser 122. The share settings can include setting for controlling access to or modification rights for the demo lab, such as for other team members of an organization. The share settings can be used to configure settings, information, or display of the end user interface 400 or associated privileges.

Figure 6:
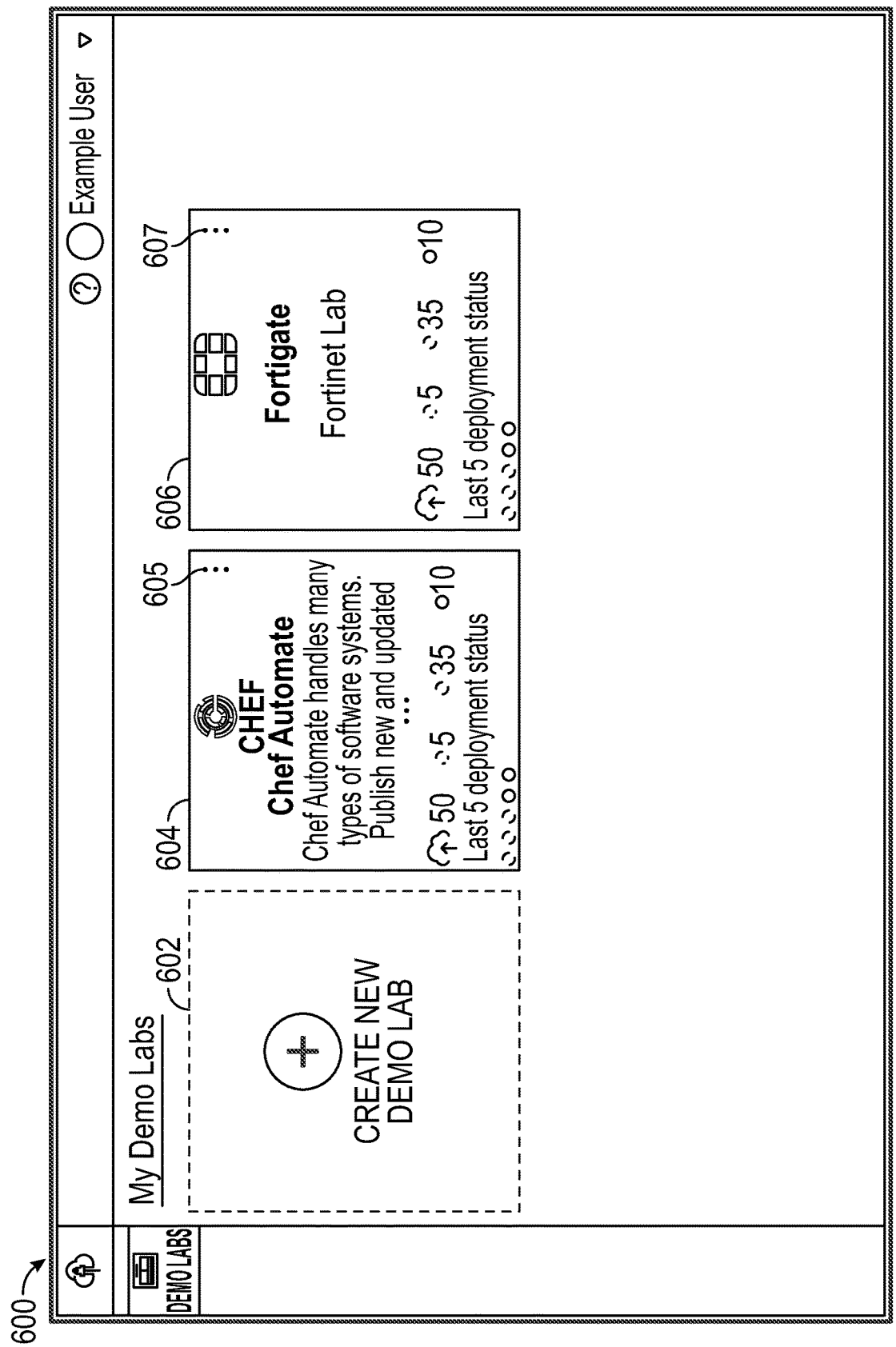
FIG. 6 illustrates a demo publisher main user interface that may be presented in the computing environment of FIG. 1 during the process flow of FIG. 5.

FIG. 6 illustrates a demo publisher main user interface 600 that may be output by the publisher portal 500, such as to the publisher user system 120 for presentation via the browser 122, during the process flow of FIG. 5. The demo publisher main user interface 600 can include a create new demo lab area 602, a first demo lab area 604, and a second demo lab area 606. Selection by the publisher user of the create new demo lab area 602 can initiate the process flow at block 510. The first demo lab area 604 and the second demo lab area 606 can be constructed and functioning demo labs that may be selected by the publisher user. A first options area 605 can be selected by the publisher user to view options for the first demo lab area 604, such as to edit a first demo lab associated with the first demo lab area 604, monitor activity for the first demo lab, or delete the first demo lab. A second options area 607 can be selected by the publisher user to view options for the second demo lab area 606, such as to edit a second demo associated with the second demo lab area 606, monitor activity for the second demo lab, or delete the second demo lab.

Figure 7:
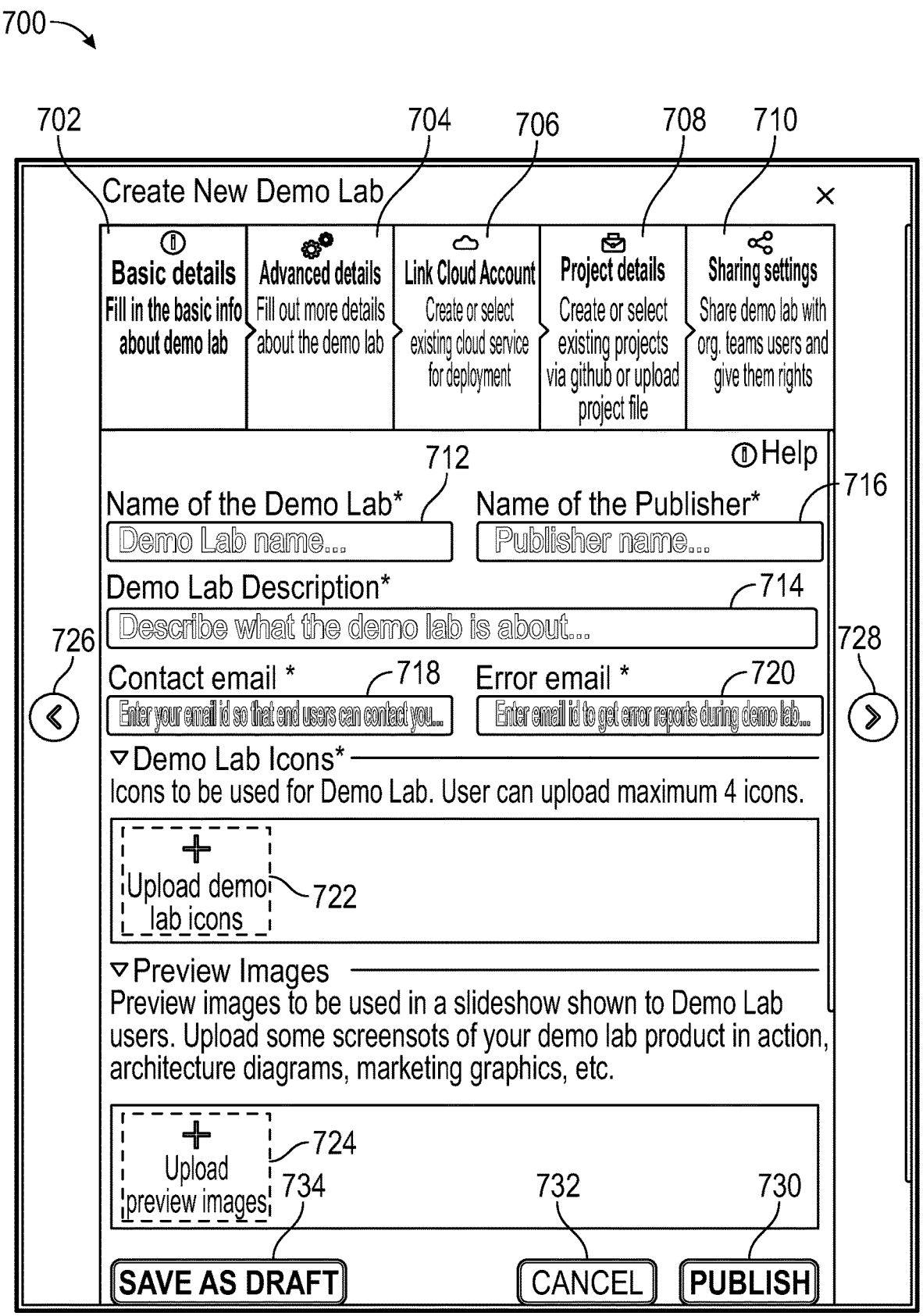
FIG. 7 illustrates a demo basic details user interface that may be presented in the computing environment of FIG. 1 during the process flow of FIG. 5.

FIG. 7 illustrates a demo basic details user interface 700 that may be output by the publisher portal 500, such as to the publisher user system 120 for presentation via the browser 122, during the process flow of FIG. 5. The demo basic details user interface 700 may be displayed upon selection by the publisher user of the create new demo lab area 602 on the demo publisher main user interface 600. A basic details icon 702 can be highlighted on the demo basic details user interface 700 to indicate that the demo basic details user interface 700 is being presented. The demo basic details user interface 700 may further include an advanced details icon 704, a link cloud account icon 706, a project details icon 708, and a sharing settings icon 710. The basic details icon 702, the advanced details icon 704, the link cloud account icon 706, the project details icon 708, and the sharing settings icon 710 can be respectively associated with the functionality of at blocks 520, 522, 524, 526, 528 of the publisher portal 500.

The demo basic details user interface 700 can include a demo lab name field 712, a demo lab description field 714, a name of publisher field 716, a contact email field 718, an error email field 720, a upload demo lab icon area 722, an upload preview images area 724, a back navigation button 726, a forward navigation button 728, a publish button 730, a cancel button 732, and a save as draft button 734. The demo lab name field 712, the demo lab description field 714, the name of publisher field 716, the contact email field 718, the error email field 720, the upload demo lab icon area 722, the upload preview images area 724 can be used to receive information to accordingly setup or configure a demo lab. The back navigation button 726 may be used to navigate to a previous screen, such as the demo publisher main user interface 600. The forward navigation button 728 can be used to navigate to a next screen, such as a demo advanced details user interface 800 described with respect to FIG. 8. The publish button 730 can be selected to publish and share the demo lab.

Figure 8:
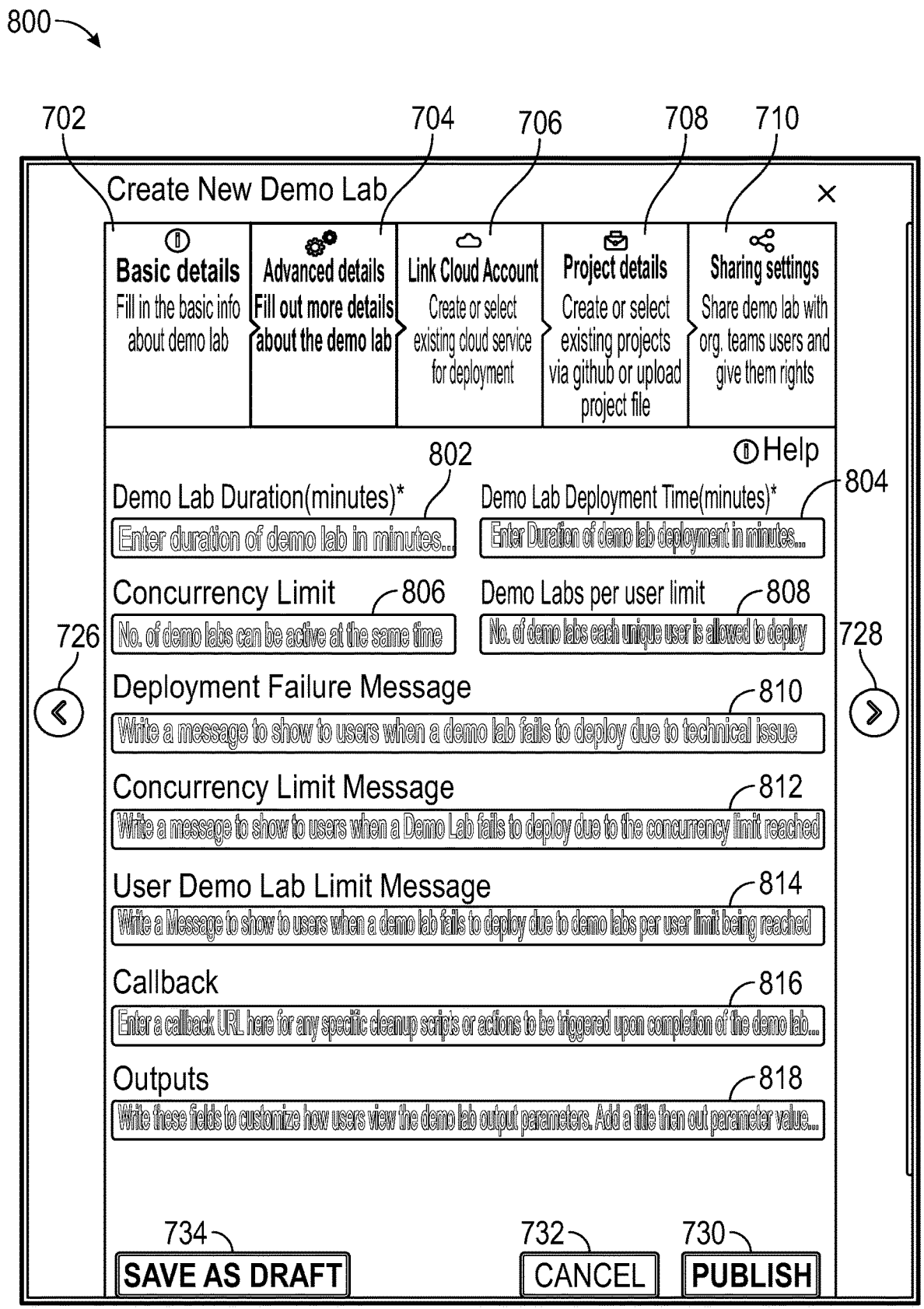
FIG. 8 illustrates a demo advanced details user interface that may be presented in the computing environment of FIG. 1 during the process flow of FIG. 5.

FIG. 8 illustrates the demo advanced details user interface 800 that may be output by the publisher portal 500, such as to the publisher user system 120 for presentation via the browser 122, during the process flow of FIG. 5. The demo advanced details user interface 800 may be displayed upon selection by the publisher user of the advanced details icon 704 on any user interface or the forward navigation button 728 on the demo basic details user interface 700. The advanced details icon 704 can be highlighted on the demo advanced details user interface 800 to indicate that the demo advanced details user interface 800 is being presented. The demo advanced details user interface 800 can include a demo lab duration field 802, a demo lab deployment time field 804, a concurrency limit field 806, a demo lab per user limit field 808, a deployment failure message field 810, a concurrency limit message field 812, a user demo lab limit message field 814, a callback field 816, and an outputs field 818.

Figure 9:
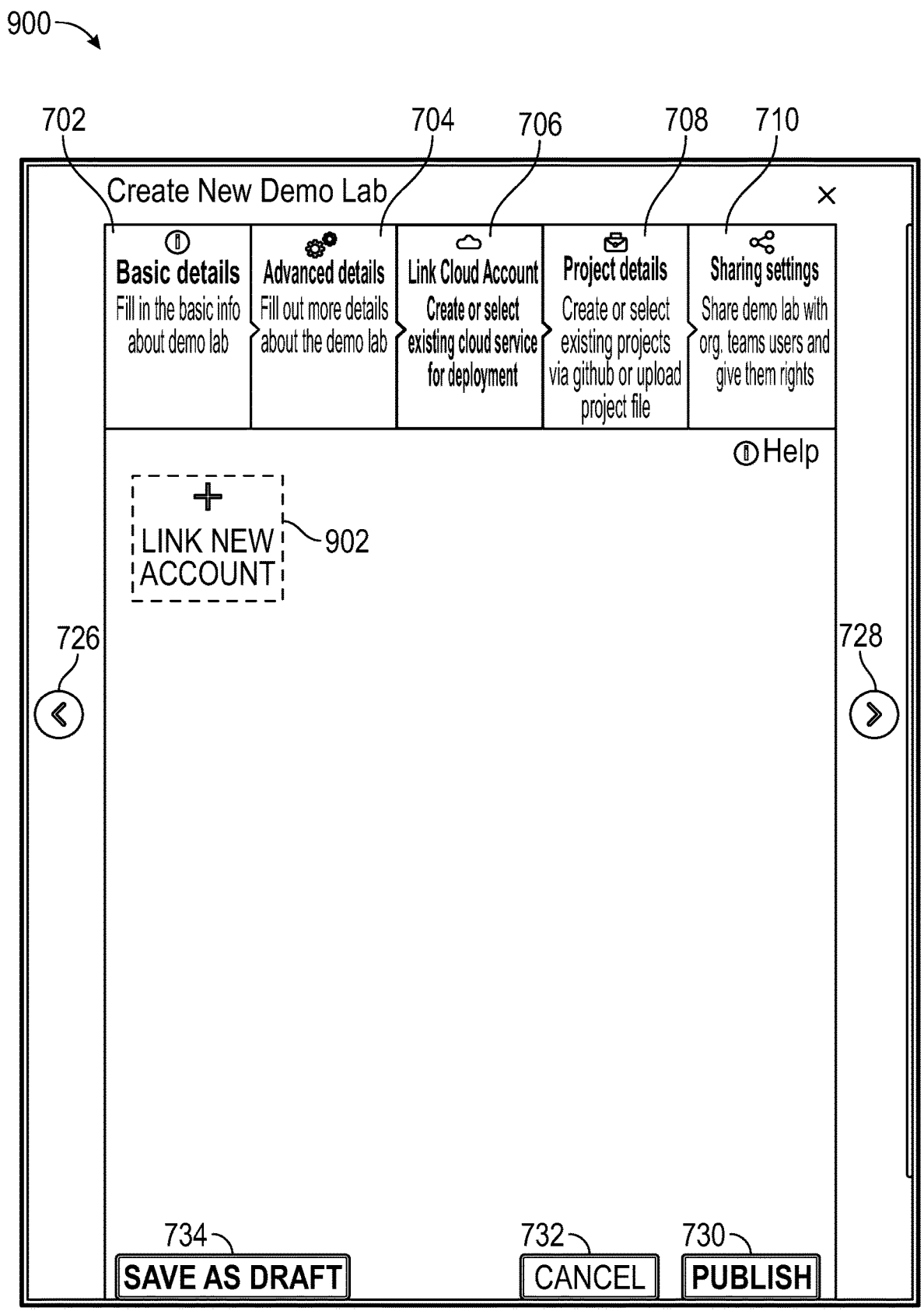
FIG. 9 illustrates a demo link cloud account user interface that may be presented in the computing environment of FIG. 1 during the process flow of FIG. 5.

FIG. 9 illustrates a demo link cloud account user interface 900 that may be output by the publisher portal 500, such as to the publisher user system 120 for presentation via the browser 122, during the process flow of FIG. 5. The demo link cloud account user interface 900 may be displayed upon selection by the publisher user of the link cloud account icon 706 on any user interface or the forward navigation button 728 on the demo advanced details user interface 800. The link cloud account icon 706 can be highlighted on the demo link cloud account user interface 900 to indicate that the demo link cloud account user interface 900 is being presented. The demo link cloud account user interface 900 can include a link new account area 902 that is selectable by the publisher user to link an account.

Figure 10:
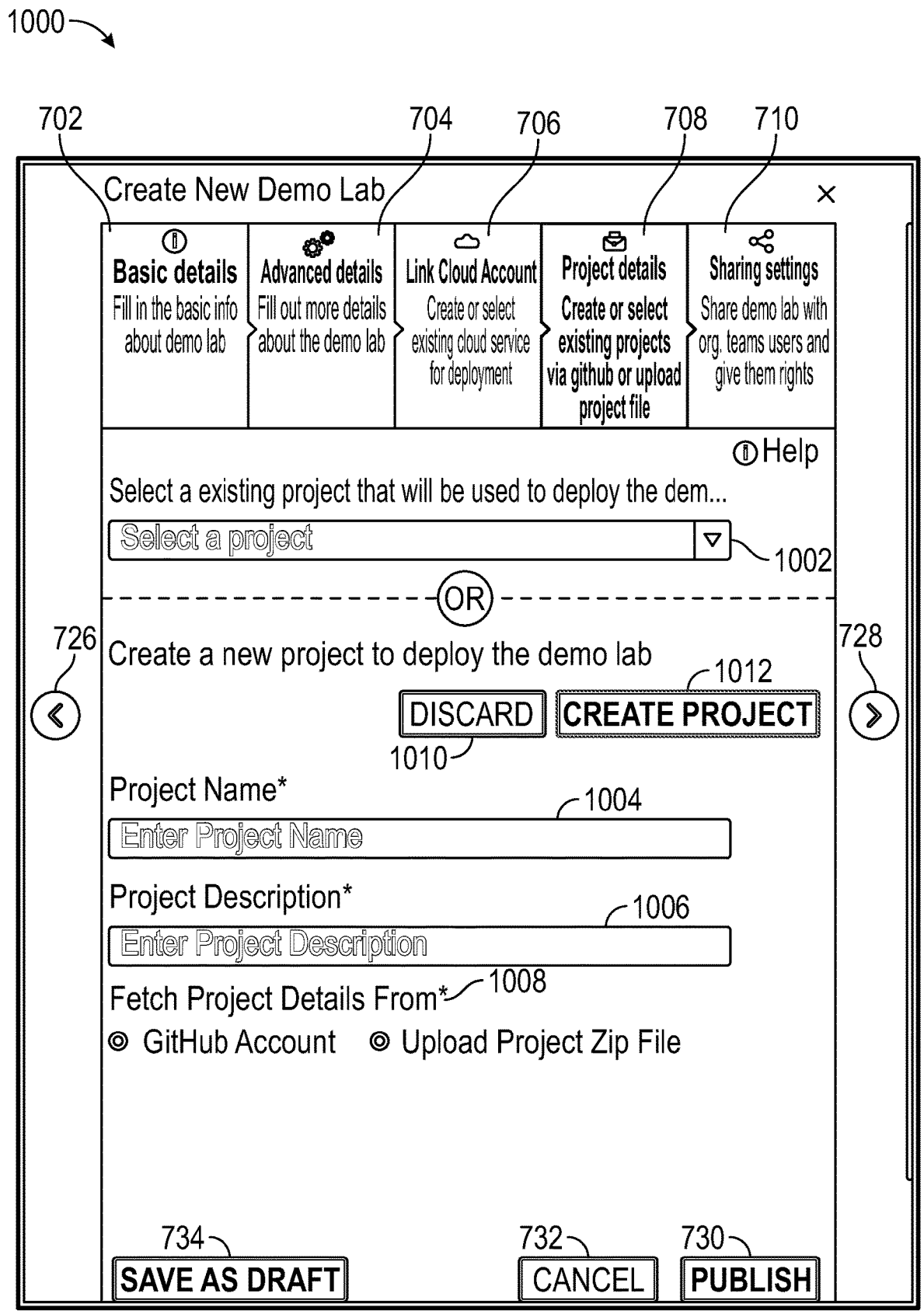
FIG. 10 illustrates a demo project details user interface that may be presented in the computing environment of FIG. 1 during the process flow of FIG. 5.

FIG. 10 illustrates a demo project details user interface 1000 that may be output by the publisher portal 500, such as to the publisher user system 120 for presentation via the browser 122, during the process flow of FIG. 5. The demo project details user interface 1000 may be displayed upon selection by the publisher user of the project details icon 708 on any user interface or the forward navigation button 728 on the demo link cloud account user interface 900. The project details icon 708 can be highlighted on the demo project details user interface 1000 to indicate that the demo project details user interface 1000 is being presented. The demo project details user interface 1000 can include a select existing project dropdown 1002, a project name field 1004, a project description field 1006, a fetch project details from selection 1008, a discard button 1010, and a create project button 1012. The select existing project dropdown 1002, the project name field 1004, the project description field 1006, and the fetch project details from selection 1008 can be used to receive information to accordingly setup or configure project information for the demo lab.

Figure 11:
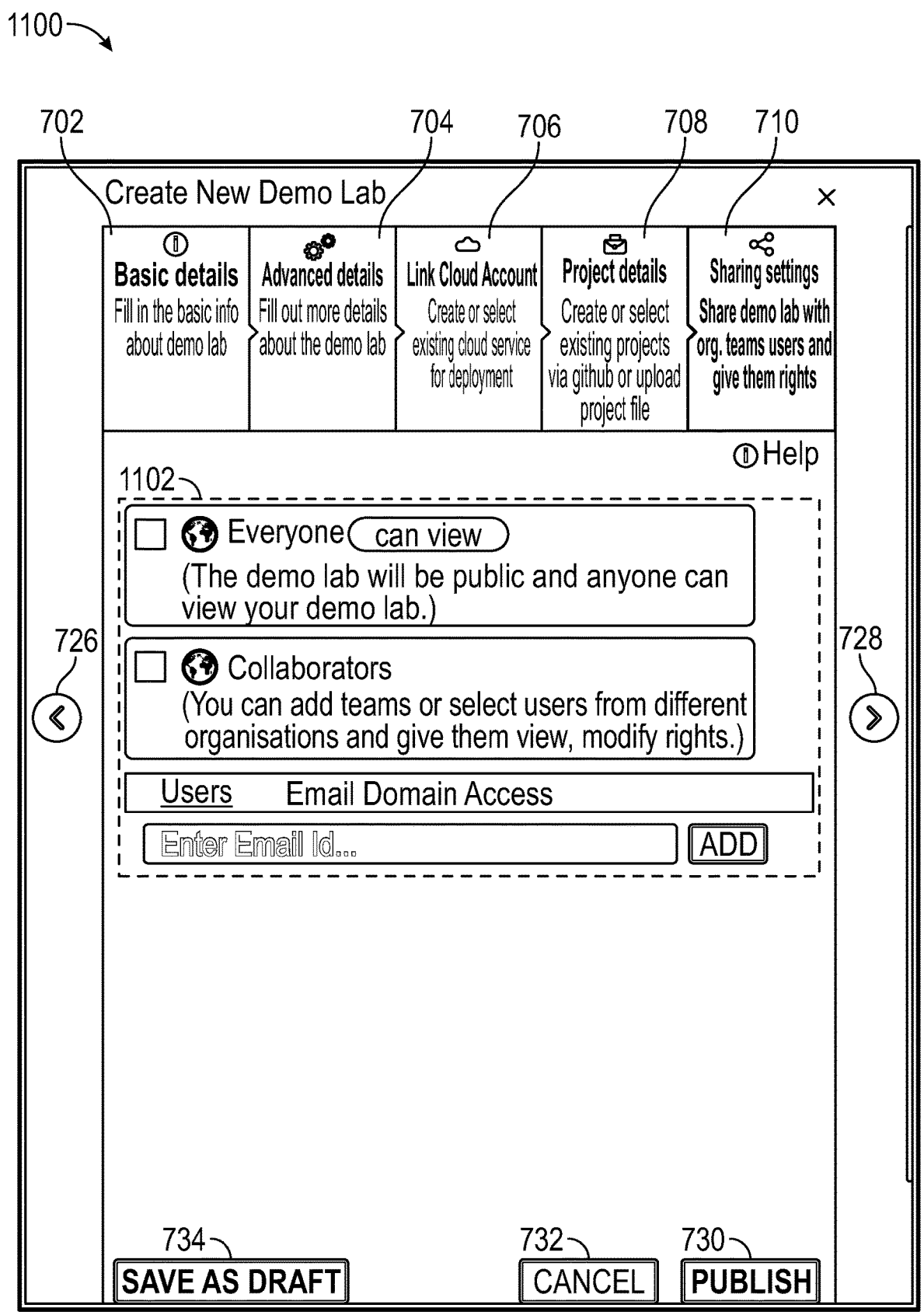
FIG. 11 illustrates a demo share settings user interface that may be presented in the computing environment of FIG. 1 during the process flow of FIG. 5.

FIG. 11 illustrates a demo share settings user interface 1100 that may be output by the publisher portal 500, such as to the publisher user system 120 for presentation via the browser 122, during the process flow of FIG. 5. The demo share settings user interface 1100 may be displayed upon selection by the publisher user of the sharing settings icon 710 on any user interface or the forward navigation button 728 on the demo project details user interface 1000. The sharing settings icon 710 can be highlighted on the demo share settings user interface 1100 to indicate that the demo share settings user interface 1100 is being presented. The demo share settings user interface 1100 can include a share settings configuration area 1102 for the publisher to provide information for controlling share settings.

Figure 12:
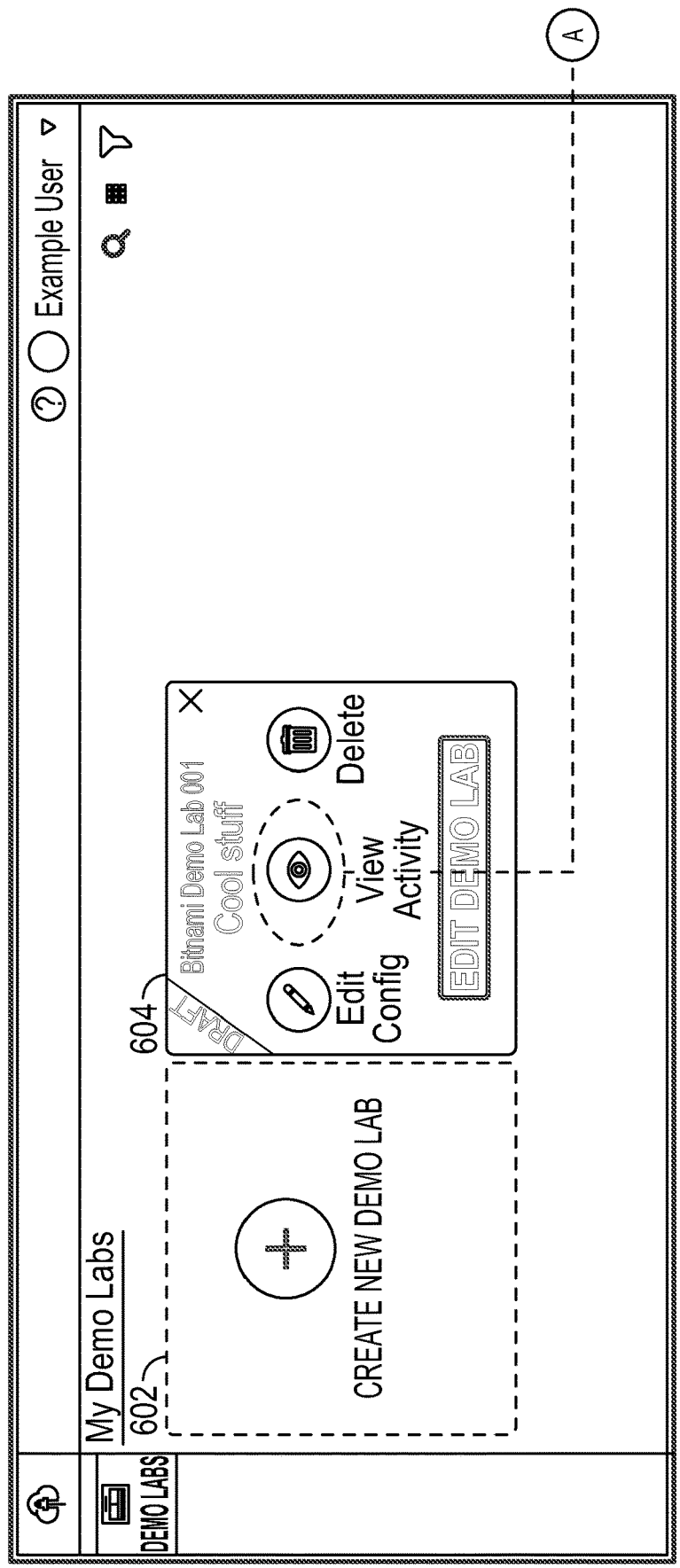
FIG. 12 illustrates a monitoring user interface that may be presented in the computing environment of FIG. 1 during the process flow of FIG. 5.

FIG. 12 illustrates a monitoring user interface 1200 that may be output by the publisher portal 500, such as to the publisher user system 120 for presentation via the browser 122, during the process flow of FIG. 5. The monitoring user interface 1200 may be displayed upon selection by the publisher user of the first options area 605 on the demo publisher main user interface 600 and then selection of a user activity icon. The monitoring user interface 1200 can present information about utilization or performance of the first demo lab that is associated with the first demo lab area 604.

The user interfaces described with respect to FIGS. 6-12 can desirably, in certain embodiments, provide enhanced user interface integration relative to other technologies and simplify for publisher users the process of creating trials. The cloud platform server 110 can thus offer an ease of use for publisher users that exceeds that of other technologies.

Figure 15:
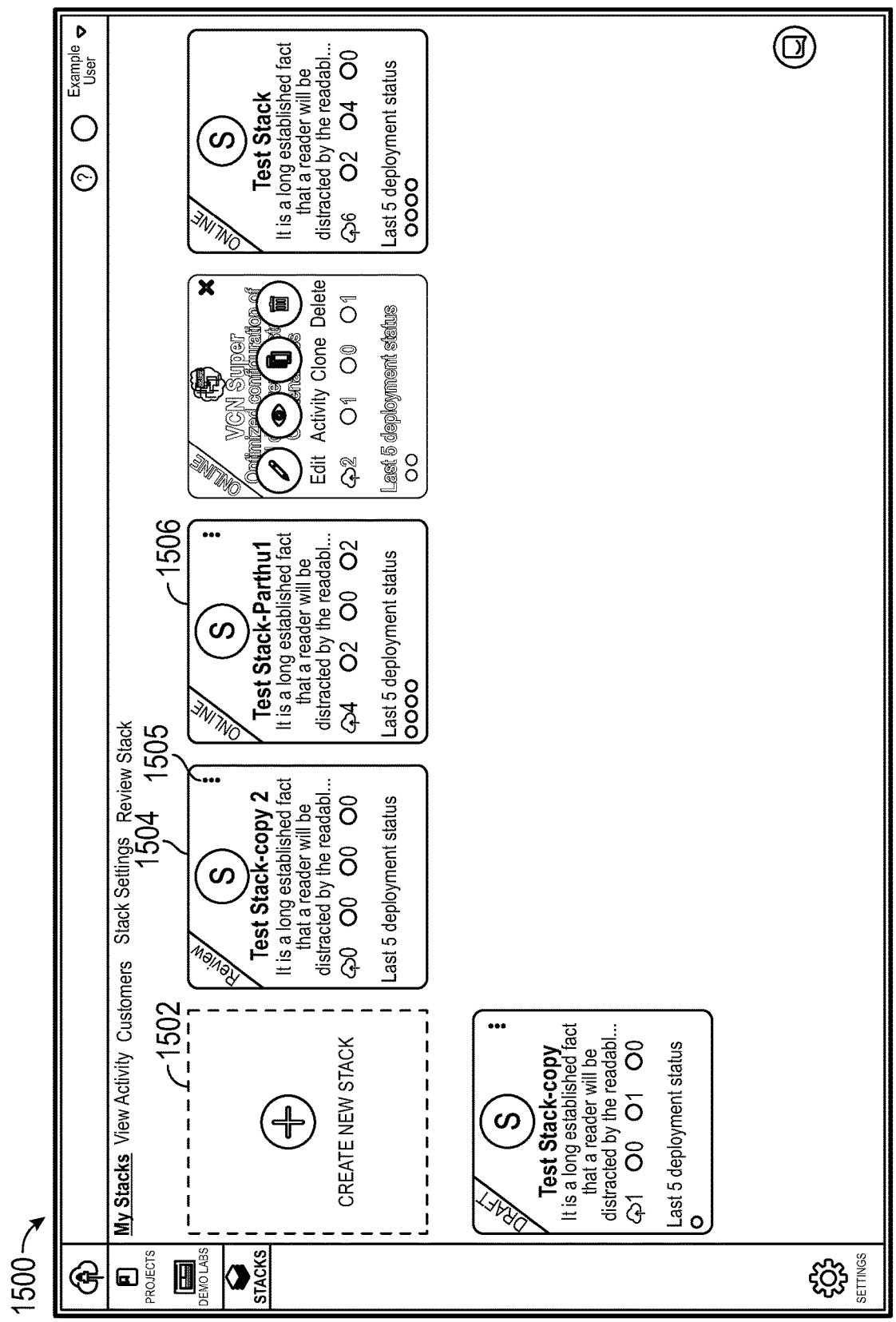
FIG. 15 illustrates a stacks publisher main user interface that may be presented in the computing environment of FIG. 1.

FIG. 15 illustrates a stacks publisher main user interface 1500 that may be output by the publisher portal 500, such as to the publisher user system 120 for presentation via the browser 122. The stacks publisher main user interface 1500 can include a create new stacks area 1502, a first stacks area 1504, and a second stacks area 1506. The first stacks area 1504 and a second stacks area 1506 can be constructed and functioning stacks that may be selected by the publisher user. A first options area 1505 can be selected by the publisher user to view options for the first stacks area 1504, such as to edit a first stack associated with the first stacks area 1504, monitor activity for the first stack, or delete the first stack.

Figure 16:
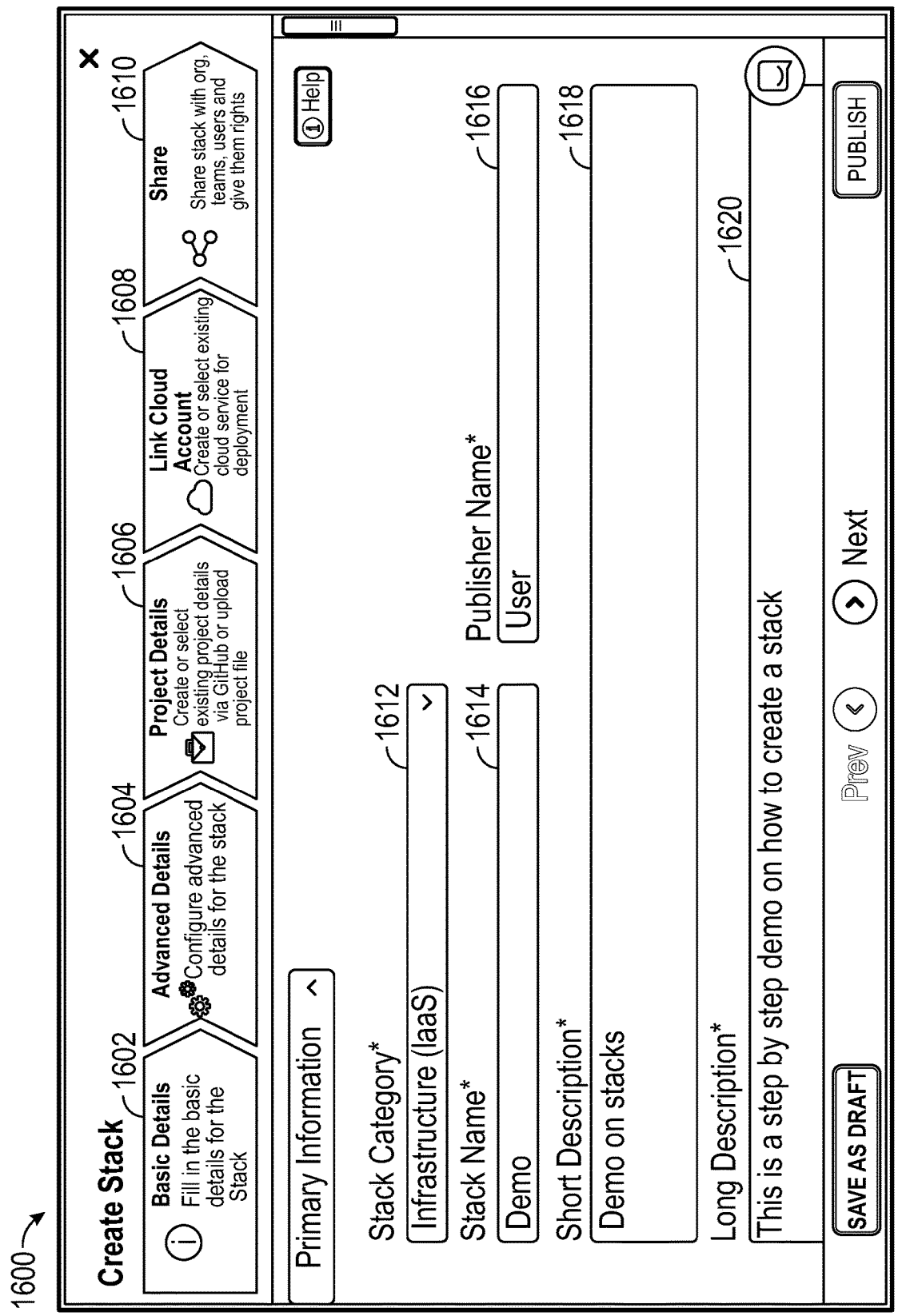
FIG. 16 illustrates a stacks basic details user interface that may be presented in the computing environment of FIG. 1.

FIG. 16 illustrates a stacks basic details user interface 1600 that may be output by the publisher portal 500, such as to the publisher user system 120 for presentation via the browser 122. The stacks basic details user interface 1600 may be displayed upon selection by the publisher user of the create new stacks area 1502 on the stacks publisher main user interface 1500. A basic details icon 1602 can be highlighted on the stacks basic details user interface 1600 to indicate that the stacks basic details user interface 1600 is being presented. The stacks basic details user interface 1600 may further include an advanced details icon 1604, a project details icon 1606, a link cloud account icon 1608, and a sharing settings icon 1610.

The stacks basic details user interface 1600 can include a stack category field 1612, a stack name field 1614, a stack publisher name field 1616, a stack short description field 1618, a stack long description field 1620, and a publish button 1622. The stack category field 1612, the stack name field 1614, the stack publisher name field 1616, the stack short description field 1618, and the stack long description field 1620 can be used to receive information to accordingly setup or configure a stack. The publish button 1622 can be selected to publish and share the stack.

Figure 17:
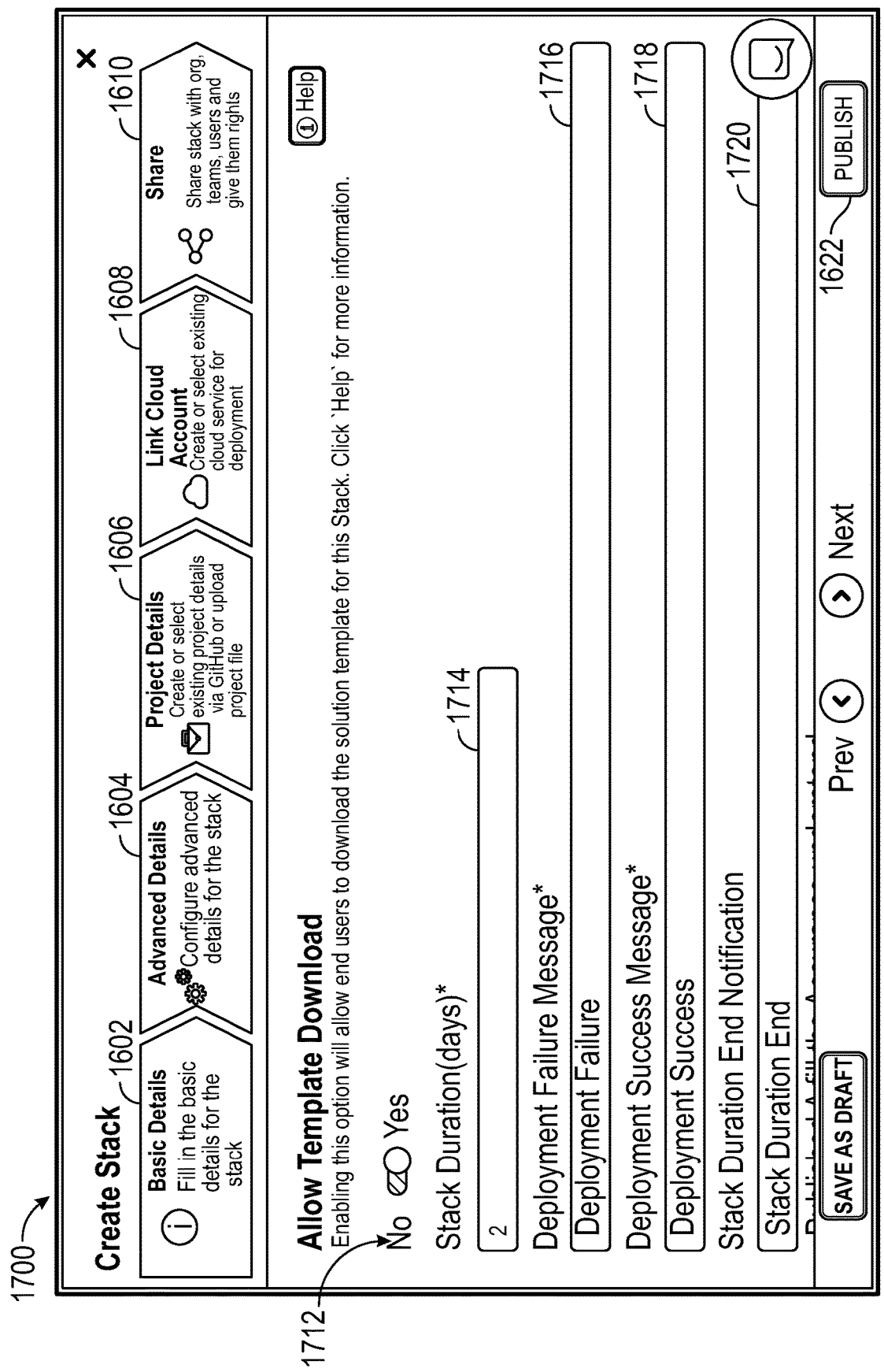
FIG. 17 illustrates a stacks advanced details user interface that may be presented in the computing environment of FIG. 1.

FIG. 17 illustrates a stacks advanced details user interface 1700 that may be output by the publisher portal 500, such as to the publisher user system 120 for presentation via the browser 122. The stacks advanced details user interface 1700 may be displayed upon selection by the publisher user of the advanced details icon 1604 on any user interface or a forward navigation button on the stacks basic details user interface 1600. The advanced details icon 1604 can be highlighted on the stacks advanced details user interface 1700 to indicate that the stacks advanced details user interface 1700 is being presented. The stacks advanced details user interface 1700 can include an allow template download toggle 1712, a stack duration field 1714, a deployment failure message field 1716, a deployment success message field 1718, and a stack duration end notification field 1720. The allow template download toggle 1712 can control whether end users may download a solution template for the stack. The stack duration field 1714 can control a number of days that an end user may be permitted to access the stack after an initial access.

Moreover, selection by the publisher user of the project details icon 1606, the link cloud account icon 1608, and the sharing settings icon 1610 can respectively cause presentation of user interfaces similar to the demo project details user interface 1000 of FIG. 10, the demo link cloud account user interface 900 of FIG. 9, and the demo share settings user interface 1100 of FIG. 11; however, the stacks user interfaces may configure a stack rather than a demo.

FIG. 18 illustrates a stacks configuration user interface 1800 that may be output by the publisher portal 500, such as to the publisher user system 120 for presentation via the browser 122. The stacks configuration user interface 1800 may be presented responsive to selection of a button or area in, for example, the stacks basic details user interface 1600 or the stacks advanced details user interface 1700. The stacks configuration user interface 1800 can include add plan(s) input fields 1802, add feature(s) input fields 1804, and map plan(s), feature(s), and project variable(s) fields 1806. The add plan(s) input fields 1802 can be used to configure an end user cost and operation parameters for use of the stack by an end user and thereby manage selling of the stack.

Figure 19:
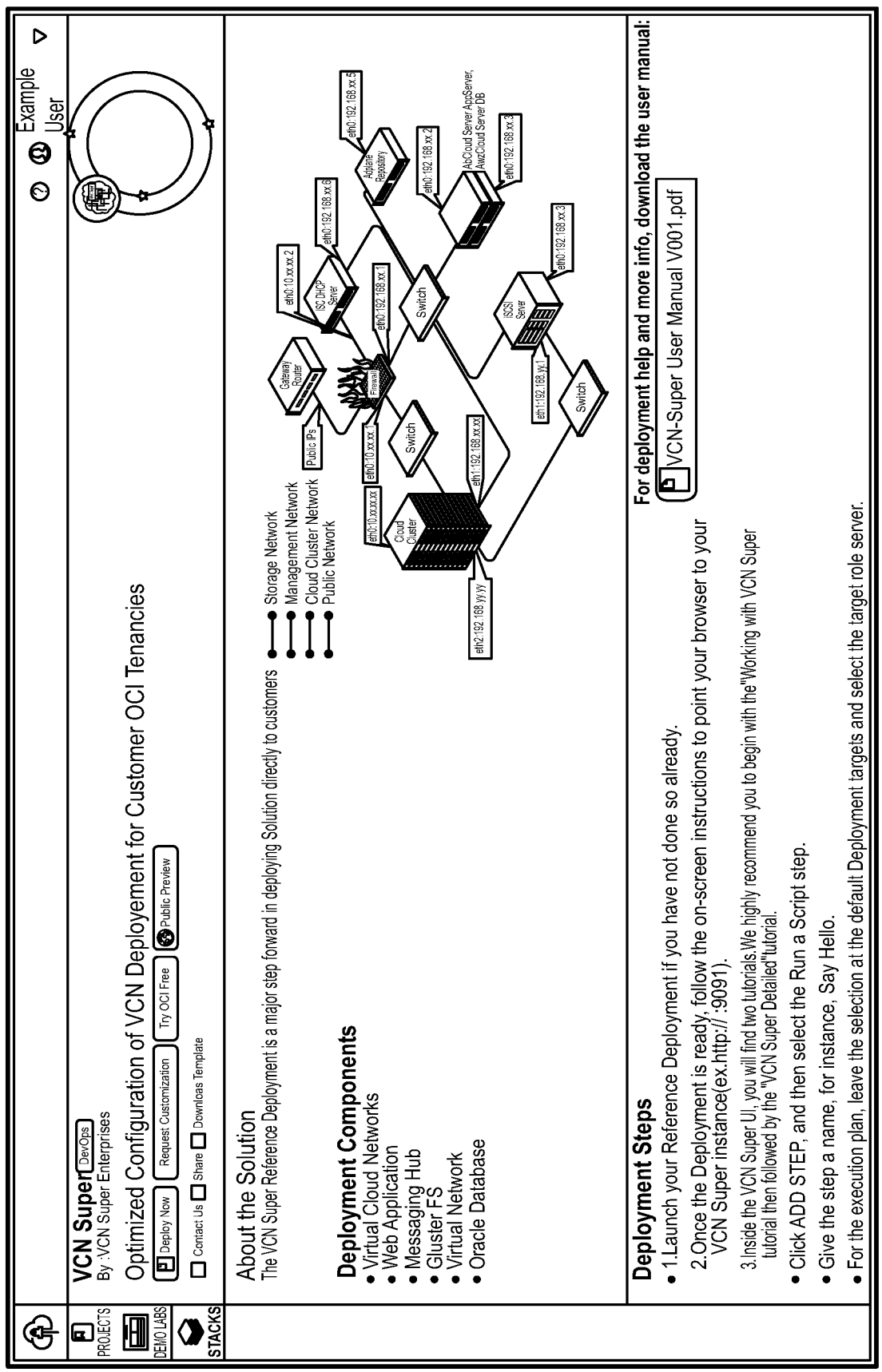
FIG. 19 illustrates a stacks end user main user interface that may be presented in the computing environment of FIG. 1.

FIG. 19 illustrates a stacks end user main user interface 1900 that may be output by the cloud platform server 110, such as to the end user system 130 for presentation via the browser 132. The stacks end user main user interface 1900 can show operation information (for example, deployment or architectural details) and costs for a particular stack that may be deployed or tried by an end user.

Figure 20:
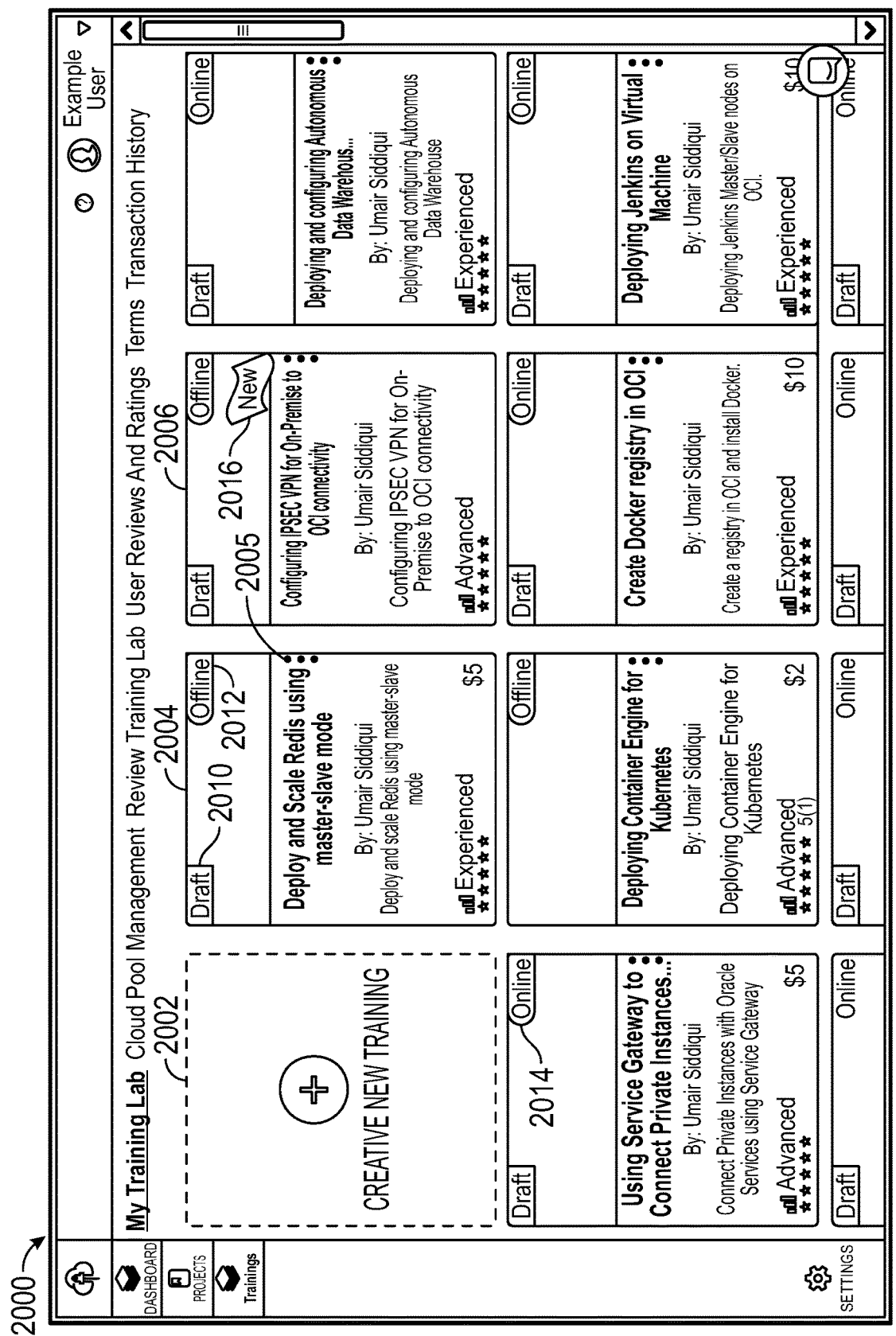
FIG. 20 illustrates a training publisher main user interface that may be presented in the computing environment of FIG. 1.

FIG. 20 illustrates a training publisher main user interface 2000 that may be output by the publisher portal 500, such as to the publisher user system 120 for presentation via the browser 122. The training publisher main user interface 2000 can include a create new training area 2002, a first training area 2004, and a second training area 2006. The first training area 2004 and a second training area 2006 can be constructed and functioning trainings that may be selected by the publisher user. A first options area 2005 can be selected by the publisher user to view options for the first training area 2004, such as to edit a first training associated with the first training area 2004, monitor activity for the first training, or delete the first training.

The training publisher main user interface 2000 can further include a draft identifier 2010, an offline identifier 2012, an online identifier 2014, and a new identifier 2016. The draft identifier 2010 can indicate that a training associated with the draft identifier 2010 is at a draft stage rather than non-draft, final stage. The offline identifier 2012 can indicate that an associated training is offline (for example, available without network access or currently unavailable), and the online identifier 2014 can indicate that an associated training is online (for example, unavailable without network access or currently available). The new identifier 2016 can denote that an associate training was recently added to the training publisher main user interface 2000.

FIG. 21 illustrates a training creation user interface 2100 that may be output by the publisher portal 500, such as to the publisher user system 120 for presentation via the browser 122. The training creation user interface 2100 can be used by the a publisher user to create or configure a training. The training creation user interface 2100 can include section details fields 2102, content builder fields 2104, and add workspace fields 2106.

FIG. 22 illustrates a training end user main user interface 2200 that may be output by the cloud platform server 110, such as to the end user system 130 for presentation via the browser 132. The training end user main user interface 2200 can include a first training area 2202, a second training area 2204, and a third training area 2206. The first training area 2202, the second training area 2204, and the third training area 2206 can each correspond to different end user selectable trainings and include associated information such as training titles, difficulty levels, or authorship details.

Figure 23:
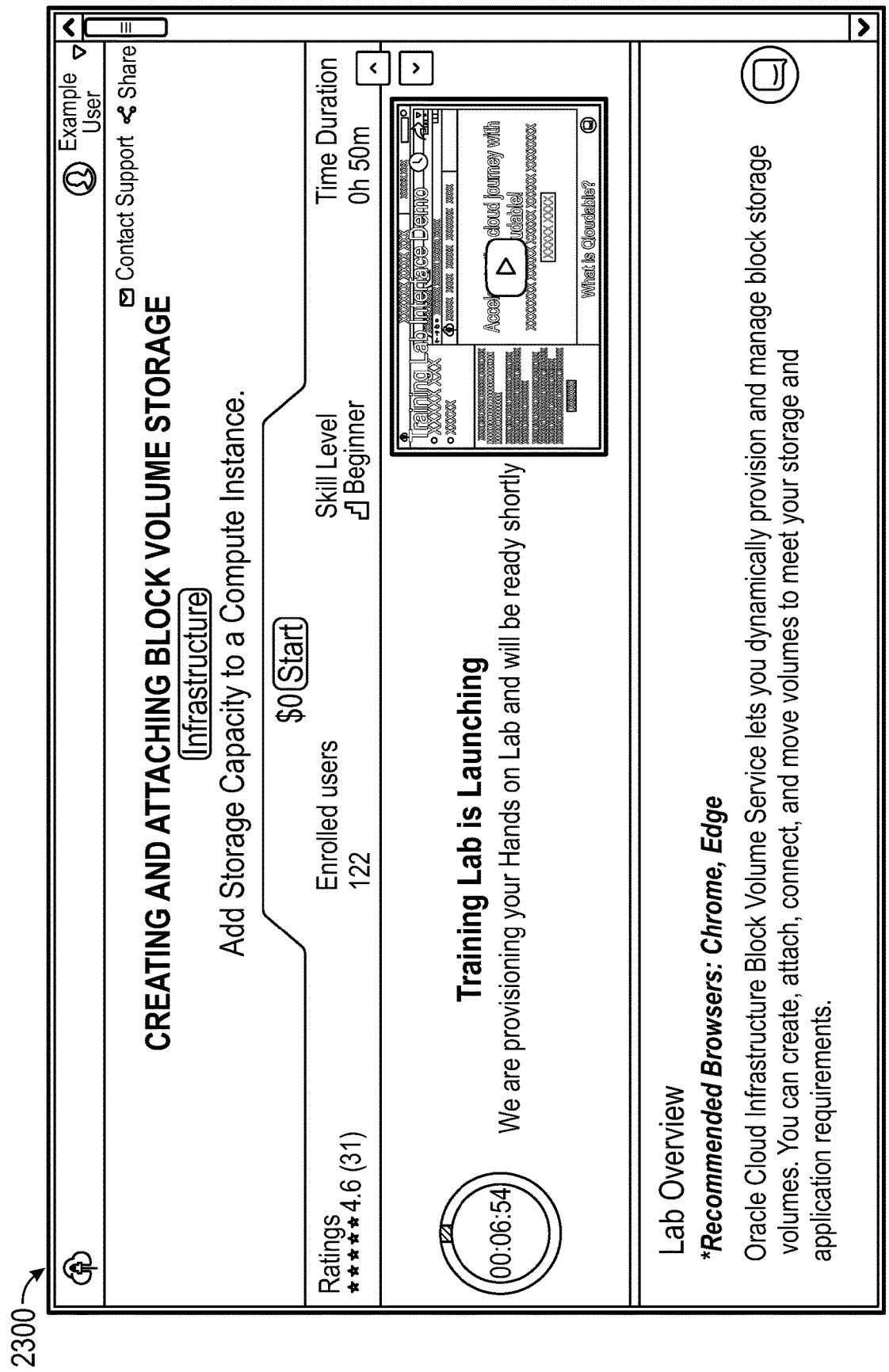
FIG. 23 illustrates a training end user program user interface that may be presented in the computing environment of FIG. 1.

FIG. 23 illustrates a training end user program user interface 2300 that may be output by the cloud platform server 110, such as to the end user system 130 for presentation via the browser 132. The training end user program user interface 2300 may be presented responsive to selection of the second training area 2204 on the training end user main user interface 2200. The training end user program user interface 2300 can present more details about a training associated with the second training area 2204 than the training end user main user interface 2200. The training end user program user interface 2300 can provide content, such as descriptions, images, etc., that a publisher may have added for a training.

Figure 24:
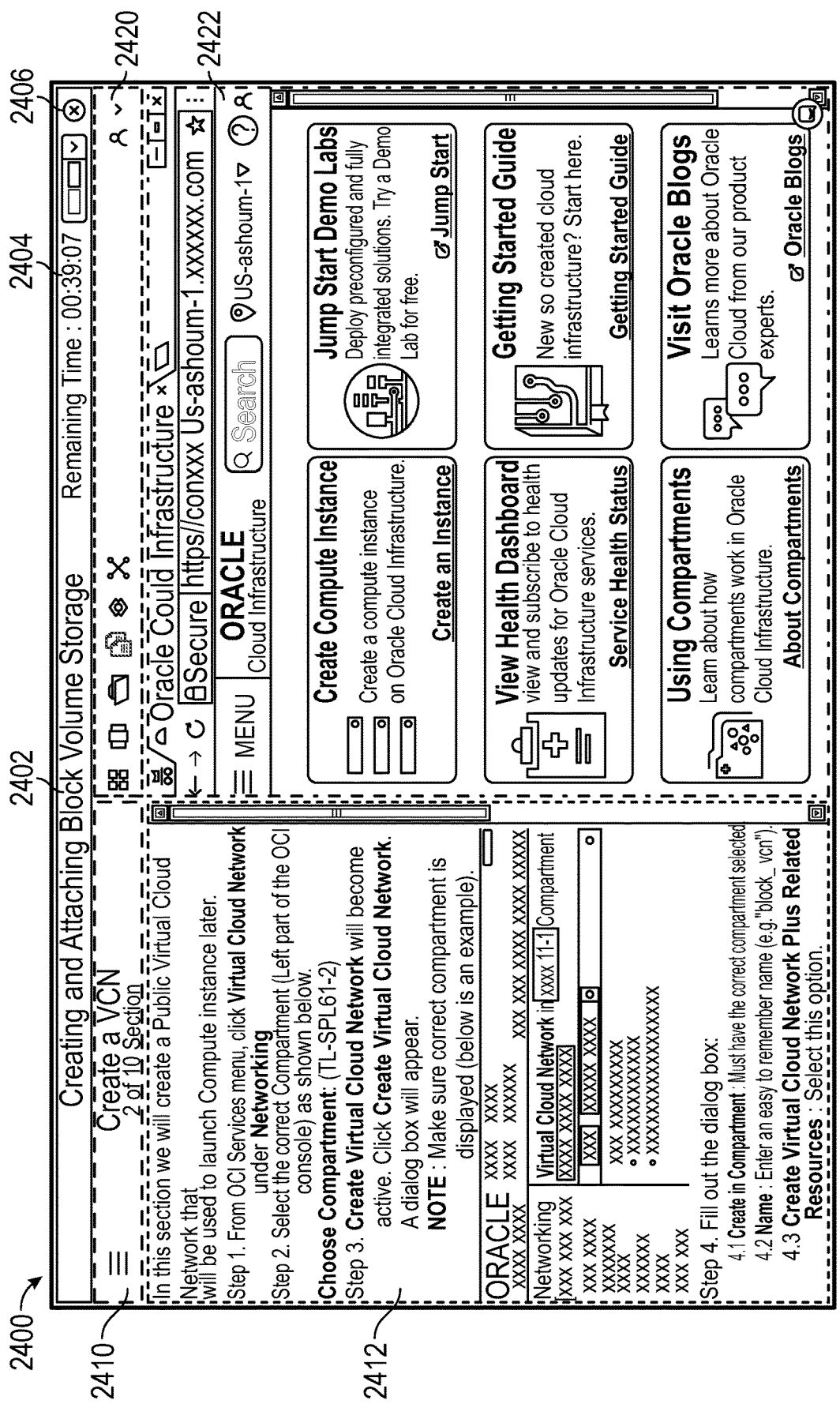

FIG. 24 illustrates a training end user session user interface 2400 that may be presented during the communications in the computing environment 100 of FIG. 1. In particular, the training end user session user interface 2400 can be presented to the end user on the browser 132 or another application of the end user system 130 during a training session, such as when the end user selects to initiate a training via the training end user program user interface 2300.

The training end user session user interface 2400 can include a training title bar 2402, a remaining training time 2404, and a training close button 2406, a training navigation control area 2410, a training instructions area 2412, a training deployment control area 2420, and a training deployment area 2422. The training title bar 2402 can present a title for a particular training session. The remaining training time 2404 can provide a remaining time until the training session may end and the end user may no longer have access to the training session without reinitiating the training session. The training close button 2406 can allow the end user to close the training end user session user interface 2400 upon selection.

The training navigation control area 2410 can identify a section of the training session that is being presented to the end user and allow the end user to navigate between different sections of the training session. The training instructions area 2412 can present instructions to the end user for learning the skills covered by the section of the training session identified in the training navigation control area 2410.

The training deployment control area 2420 can provide controls for configuring or adjusting the presentation of the training deployment shown in the training deployment area 2422. The training deployment area 2422 can be an area in which the training deployment allows the end user to experiment with a deployment solution and follow along with the instructions provided in the training instructions area 2412 so that the end user can learn to use the deployment solution. The training deployment area 2422 can, for example, present a browser that initiates and presents the deployment solution as described herein, such as by providing public cloud access through a remote desktop. The training deployment area 2422 can be an interactive virtual console that connects to a deployed lab in the cloud and may contain additional applications to help accomplish a training use case for the end user.

The training end user session user interface 2400 advantageously can, in certain embodiments, consolidate various aspects and tools of a training process for a solution within a single interface and dramatically accelerate learning and completion of the training process. The training end user session user interface 2400 can contrast with another training approach in which a training deployment area is disconnected and separate from a training instructions area, such as in two separate interfaces on two different screens. Because the training navigation control area 2410, the training instructions area 2412, the training deployment control area 2420, and the training deployment area 2422 can be integrated together in the training end user session user interface 2400, the training end user session user interface 2400 can provide seamless operation, control, and transitions between its different areas. For example, advancement to a particular section of the training session that is presented in the training navigation control area 2410 and the training instructions area 2412 can automatically advance or adjust the features or portions of the solution presented in the training deployment area 2422 so that the end user can readily follow along with and learn from the training session. In addition, the training end user session user interface 2400 can desirably, in certain embodiments, minimize or eliminate client solution installations or incompatibility issues, as well as control an end user experience through a browser rather than multiple different applications.

Figure 25:
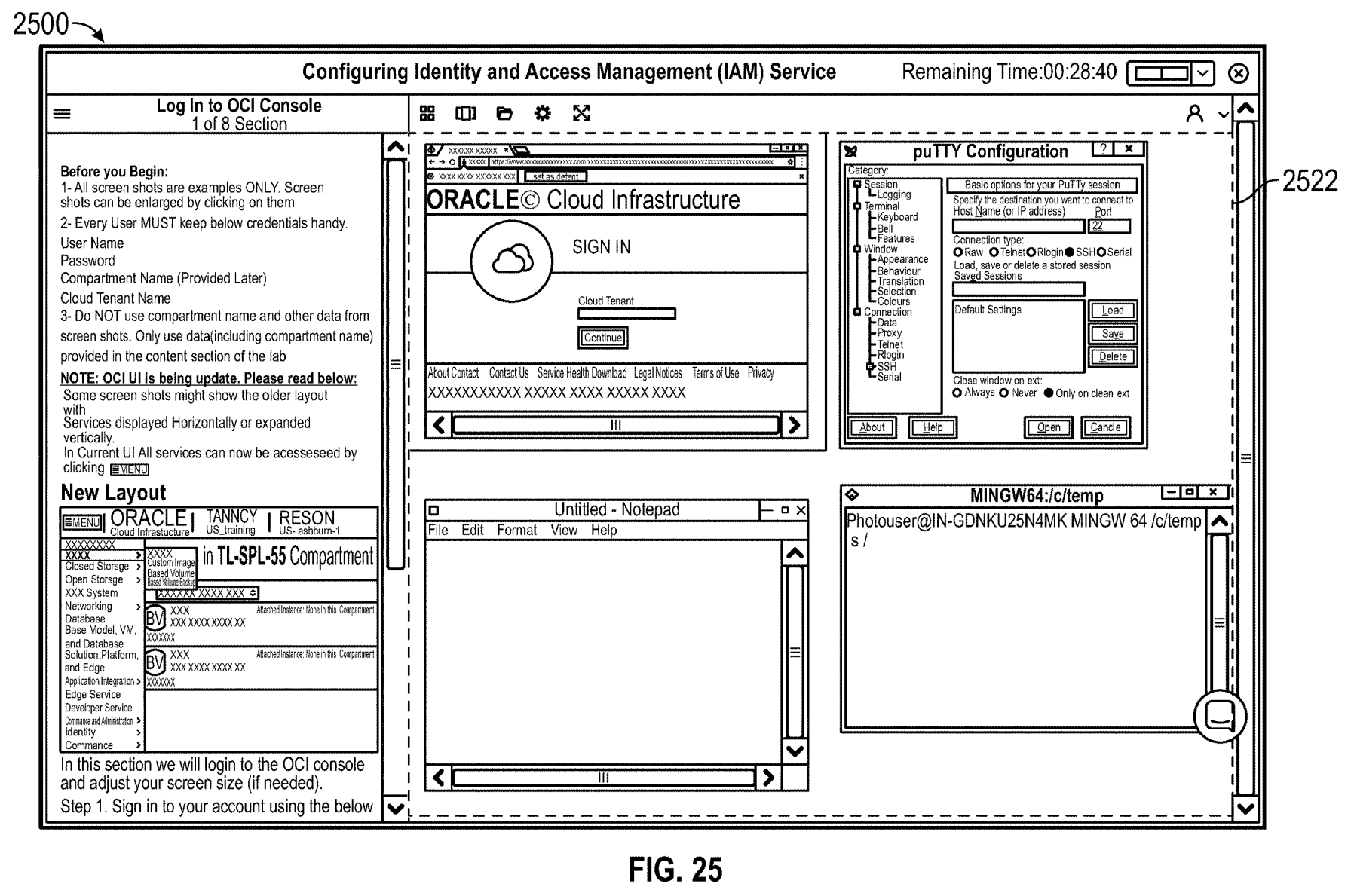

FIG. 25 illustrates a training end user session user interface 2500 that may be presented during the communications in the computing environment 100 of FIG. 1. In particular, the training end user session user interface 2500 can be presented to the end user on the browser 132 or another application of the end user system 130 during a training session, such as when the end user selects to initiate a training via at least a selection of the third training area 2206 on the end user program user interface 2300. The training end user session user interface 2500 can be similar to the training end user session user interface 2400 but may present a different training from the training end user session user interface 2400. The training end user session user interface 2500 can include a training deployment area 2522, which can be a cloud deployment area in which a deployment as described herein may be presented to a user for training and alongside training instructions.

Each of the user interfaces shown in FIGS. 4, 6-12, and 15-25 includes one or more user interface controls that can be selected by a user, for example, using a browser or other application software (such as a mobile application). Thus, each of the user interfaces shown may be output for presentation by electronic hardware as graphical user interfaces, which may optionally include a browser or any other application software installed thereon that outputs the user interfaces.

The user interface controls shown are merely illustrative examples and can be varied in other embodiments. For instance, any of the user interface controls shown may be substituted with other types of user interface controls that provide the same or similar functionality. Some examples of user interface controls that may be used include buttons, dropdown boxes, select boxes, text boxes or text fields, checkboxes, radio buttons, toggles, breadcrumbs (e.g., identifying a page or interface that is displayed), sliders, search fields, pagination controls, tags, icons, tooltips, progress bars, notifications, message boxes, image carousels, modal windows (such as pop-ups), date and/or time pickers, accordions (e.g., a vertically stacked list with show/hide functionality), and the like. Additional user interface controls not listed here may be used.

Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input (e.g., finger or pen), game controller, or keyboard input, among other user interface input options.

V. System Structures

Figure 13:
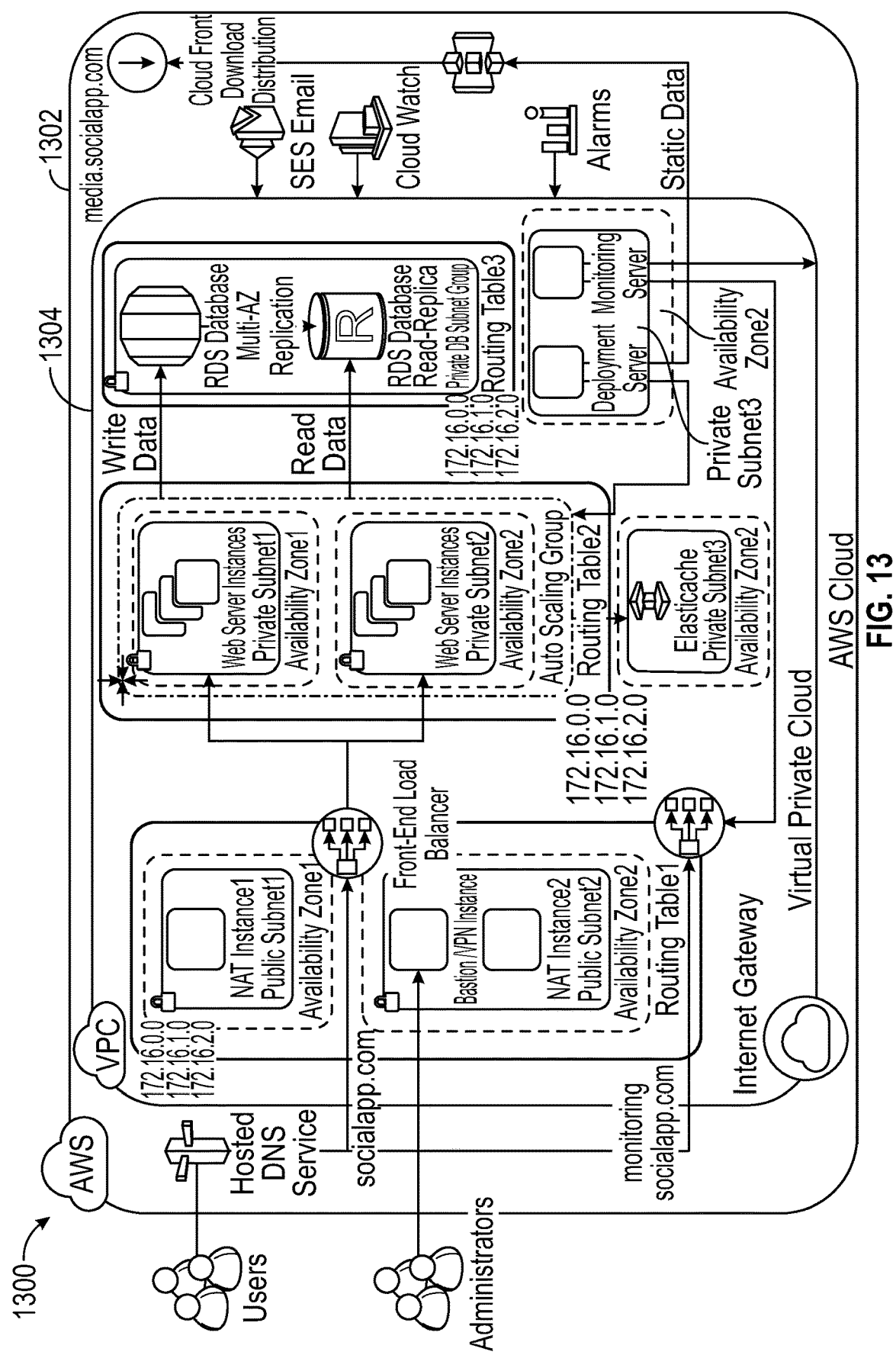
FIG. 13 illustrates a cloud application production deployment in the computing environment of FIG. 1.

FIG. 13 illustrates a cloud application production deployment 1300 in the computing environment 100. The cloud application production deployment 1300 may be configured to operate in accordance with this disclosure and provides a detailed implementation example of aspects of this disclosure. The cloud application production deployment 1300 can include a AWS cloud 1302 and a virtual private cloud (VPC) 1304 that have corresponding components or features that are illustrated in FIG. 13.

Figure 14:
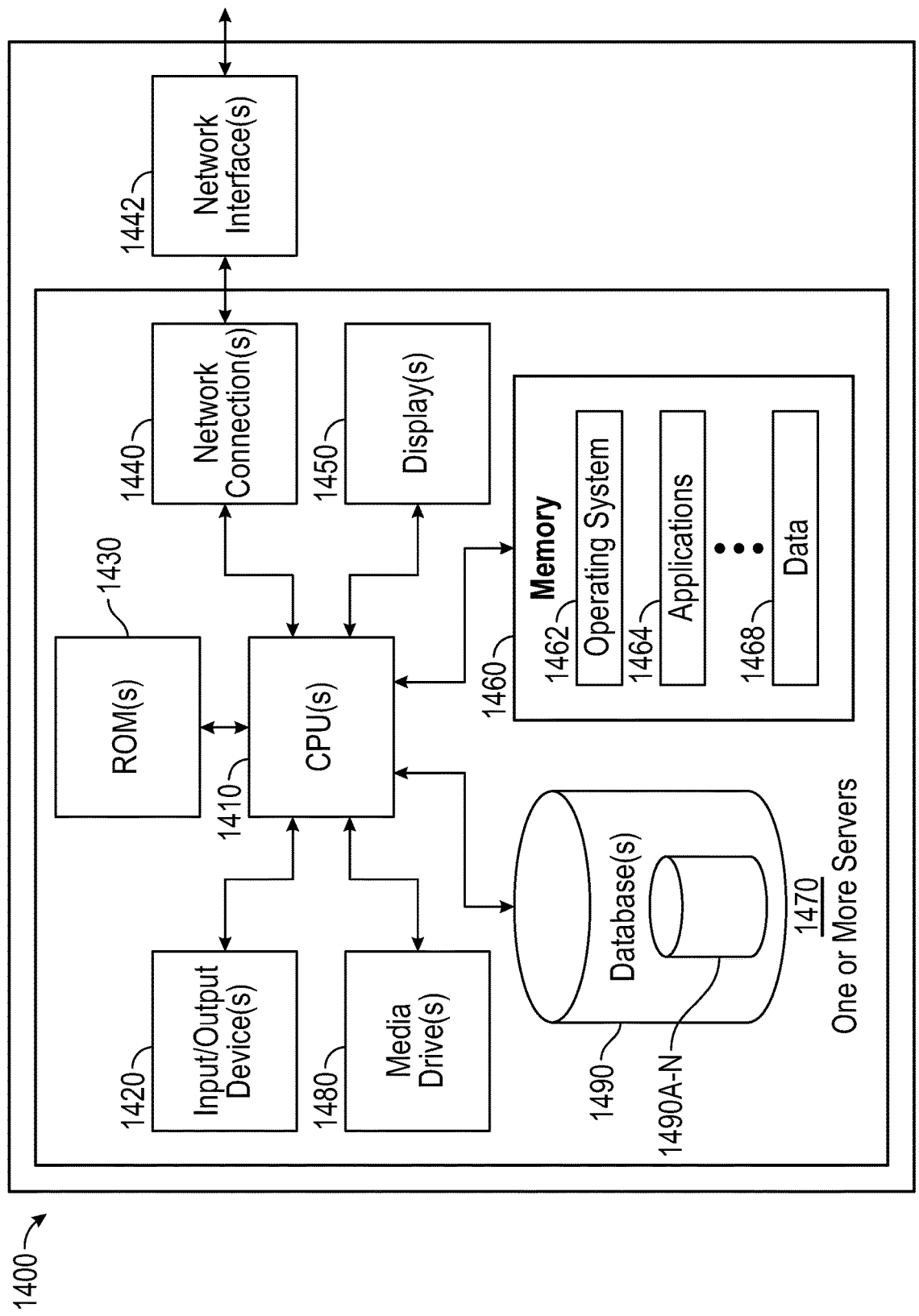
FIG. 14 illustrates a computer system usable to construct one or more of the systems or servers within the computing environment of FIG. 1.

FIG. 14 illustrates an example computer system 1400 usable to construct one or more of the systems (for instance, the publisher user system 120 or the end user system 130) or servers (for instance, the cloud platform server 110 or the third-party support server 140), for instance, within the computing environment 100 of FIG. 1.

As shown in FIG. 14, the computer system 1400 can include (i) one or more processors (CPUs) 1410, (ii) an input/output device(s) 1420 configured to allow users to input and output information and interact with the system 1400 as well as transfer and receive data, (iii) one or more read only memory (ROMs) devices 1430 or equivalents to provide nonvolatile storage of data or programs, (iv) one or more displays 1450 such as a computer monitor or other display device, (v) one more network connections 1440 and associated network interfaces 1442 configured to allow the system 1400 to connect to other systems, servers or portable devices, as well as one or more memory spaces 1460 and one or more databases 1490. Database(s) 1490 may be further divided or distributed as one or more sub-databases 1490A-

1490N, with the sub-databases storing feature or function specific information associated with a particular feature or function. The various components shown in FIG. 14 may be incorporated in one or more physical servers 1470. It is noted that the various components shown in FIG. 14, including database 1490, can be included as part of server(s) 1470, however, they may be external to server(s) 1470 in some embodiments. For example, database(s) 1490 may be external to server(s) 1470 and may be part of a separate database server system or networked database system. In some instances, the computer system 1400 may not be a server but rather a computing device like a desktop computer or mobile device.

One or more memory spaces 1460 may comprise DRAM, SRAM, FLASH, hard disk drives or other memory storage devices, such as media drives 1480, configured to store operating systems 1462, application programs or data 1464, and one or more memory spaces 1460 may be shared with, distributed with or overlap with the memory storage capacity of database(s) 1490. In some embodiments, one or more memory spaces 1460 may include database(s) 1490 or, in some embodiments, database(s) 1490 may include data 1468 as shown in memory space 1460. Data stored in memory space 1460 or database(s) 1490 may include information, such as code templates, program executable code for the platform, or other types of data described herein.

The computer system 1400 can operate and provide features utilizing one or more of the following technologies: Docker Swarm™ clusters, micro-services, representational state transfer (REST) APIs, authentication, authorization, hooks to call external APIs, or in-app support models.

VI. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines or computing systems that can function together.

Although the cloud platform server 110 may be described as being accessed by users via browsers in some examples, the cloud platform server 110 may instead be accessed or configured via other applications or interfaces in some implementations.

The term "cloud," in addition to having its ordinary meaning, can refer to an electronic system that enables access to shared pools of configurable system resources and higher-level services that can be rapidly provisioned with minimal management effort and that may be accessed over a computer network.

Infrastructure code can be written in a domain specific language (DSL) per a specification of a cloud or service provider and may be used to describe a desired state of an infrastructure or application component or a service offered by a cloud or service provider. Examples of DSLs include cloud provider DSL, configuration management DSL, or container DSL.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. A method for configuring multiple infrastructure deployments across a computer network and enabling trials of the multiple infrastructure deployments, the method comprising:
   receiving, by a network communications device, a first deployment request and a second deployment request via a computer network;
   using a code template, constructing, by one or more hardware processors, a first virtual container responsive to the first deployment request and a second virtual container responsive to the second deployment request;
   initiating, by the one or more hardware processors, performance of processing requested by the first virtual container and the second virtual container and of servicing input and output requests for the first virtual container and the second virtual container without permitting communication between the first virtual container and the second virtual container;
   determining, by the one or more hardware processors, that the first virtual container is running a trial deployment from a configuration of the first virtual container and that the second virtual container is not running the trial deployment from a configuration of the second virtual container;
   restricting, by the one or more hardware processors, a function in the first virtual container without restricting the function in the second virtual container responsive to determining that the first virtual container is running the trial deployment and that the second virtual container is not running the trial deployment; and
   deconstructing, by the one or more hardware processors, the first virtual container and the second virtual container so that the first virtual container and the second virtual container are no longer accessible.

2. The method of claim 1, wherein said constructing the first virtual container and the second virtual container comprises configuring a first infrastructure of a first cloud provider for the first virtual container and a second infrastructure of a second cloud provider for the second virtual container, the first cloud provider being different from the second cloud provider.

3. The method of claim 1, further comprising revising, by the one or more hardware processors, the code template responsive to user inputs.

4. The method of claim 1, wherein the code template comprises infrastructure as code that defines virtual datacenter infrastructure.

5. The method of claim 1, wherein the code template is written in a structured format.

6. The method of claim 1, wherein the first deployment request and the second deployment request are received from a plurality of end user systems, and further comprising opening, by the one or more hardware processors, sockets to the first virtual container and the second virtual container so that the first virtual container and the second virtual container transmit logs of end user activity in the first virtual container and the second virtual container to a plurality of configuration user systems.

7. The method of claim 1, wherein the first deployment request and the second deployment request are respectively received from a first end user system and a second end user system different from the first end user system, and further comprising outputting, by the one or more hardware processors, a first user interface for the first virtual container for presentation by the first end user system and output a second user interface for the second virtual container for presentation by the second end user system.

8. The method of claim 7, wherein the first user interface is different from the second user interface.

9. The method of claim 1, wherein said deconstructing the first virtual container and the second virtual container is performed responsive to one or more user inputs received via the computer network from one or more configuration user systems.

10. The method of claim 1, wherein said restricting the function in the first virtual container comprises limiting a usability of the first virtual container to a trial duration.

11. The method of claim 10, wherein the trial duration is no more than 10 days.

12. A system for configuring multiple infrastructure deployments across a computer network and enabling trials of the multiple infrastructure deployments, the system comprising:
   a network communications device configured to communicate via a computer network and receive a first deployment request and a second deployment request via the computer network; and
   one or more hardware processors in communication with the network communications device, the one or more hardware processors being configured to:
      using a code template, construct a first virtual container responsive to the first deployment request and a second virtual container responsive to the second deployment request,
      initiate performance of processing requested by the first virtual container and the second virtual container and servicing of input and output requests for the first virtual container and the second virtual container without permitting communication between the first virtual container and the second virtual container,
      determine that the first virtual container is running a trial deployment from a configuration of the first virtual container and that the second virtual container is not running the trial deployment from a configuration of the second virtual container,
      restrict a function in the first virtual container without restricting the function in the second virtual container responsive to determining that the first virtual container is running the trial deployment and that the second virtual container is not running the trial deployment, and deconstruct the first virtual container and the second virtual container so that the first virtual container and the second virtual container are no longer accessible.

13. The system of claim 12, wherein the one or more hardware processors is configured to use the code template to configure a first infrastructure of a first cloud provider for the first virtual container and a second infrastructure of a second cloud provider for the second virtual container, the first cloud provider being different from the second cloud provider.

14. The system of claim 12, wherein the one or more hardware processors is configured to revise the code template responsive to user inputs.

15. The system of claim 12, wherein the code template comprises infrastructure as code that defines virtual datacenter infrastructure.

16. The system of claim 12, wherein the first deployment request and the second deployment request are received from a plurality of end user systems, and the one or more hardware processors is configured to open sockets to the first virtual container and the second virtual container so that the first virtual container and the second virtual container transmit logs of end user activity in the first virtual container and the second virtual container to a plurality of configuration user systems.

17. The system of claim 12, wherein the first deployment request and the second deployment request are respectively received from a first end user system and a second end user system different from the first end user system, and the one or more hardware processors is configured to output a first user interface for the first virtual container for presentation by the first end user system and output a second user interface for the second virtual container for presentation by the second end user system.

18. The system of claim 12, wherein the one or more hardware processors is configured to deconstruct the first virtual container and the second virtual container responsive to one or more user inputs received via the computer network from one or more configuration user systems.

19. The system of claim 12, wherein the one or more hardware processors is configured to restrict the function in the first virtual container by limiting a usability of the first virtual container to a trial duration.

20. The system of claim 19, wherein the trial duration is no more than 1 day.

* * * * *